(12) United States Patent
Sun et al.

(10) Patent No.: US 11,902,203 B2
(45) Date of Patent: Feb. 13, 2024

(54) APERIODIC SRS TRIGGERING MECHANISM ENHANCEMENT

(71) Applicant: APPLE INC., Cupertino, CA (US)

(72) Inventors: Haitong Sun, Cupertino, CA (US); Chunxuan Ye, San Diego, CA (US); Dawei Zhang, Cupertino, CA (US); Hong He, Cupertino, CA (US); Huaning Niu, Cupertino, CA (US); Jie Cui, Cupertino, CA (US); Oghenekome Oteri, San Diego, CA (US); Seyed Ali Akbar Fakoorian, San Diego, CA (US); Wei Zeng, Cupertino, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 17/441,650

(22) PCT Filed: Apr. 3, 2021

(86) PCT No.: PCT/CN2021/085488
§ 371 (c)(1),
(2) Date: Sep. 21, 2021

(87) PCT Pub. No.: WO2022/205488
PCT Pub. Date: Oct. 6, 2022

(65) Prior Publication Data
US 2023/0231679 A1    Jul. 20, 2023

(51) Int. Cl.
*H04L 5/00*    (2006.01)

(52) U.S. Cl.
CPC .......... *H04L 5/0051* (2013.01); *H04L 5/0094* (2013.01)

(58) Field of Classification Search
None
See application file for complete search history.

(56) References Cited

U.S. PATENT DOCUMENTS

| 2020/0107319 A1 | 4/2020 | Bagheri et al. |
| 2020/0259625 A1 | 8/2020 | Papasakellariou |

(Continued)

FOREIGN PATENT DOCUMENTS

| CN | 110460416 | 11/2019 |
| CN | 110650001 A | 1/2020 |

(Continued)

OTHER PUBLICATIONS

International Patent Application No. PCT/CN2021/085488, International Search Report and Written Opinion, dated Jan. 7, 2022, 9 pages.

(Continued)

*Primary Examiner* — Diane L Lo
(74) *Attorney, Agent, or Firm* — Kilpatrick Townsend & Stockton LLP

(57) ABSTRACT

Provided is a method for a user equipment (UE). The UE obtains, from a network device, a first configuration information. The first configuration information indicates a first resource set for an aperiodic Sounding Reference Signal (AP-SRS). The first resource set for the AP-SRS includes a first list of slot offsets. The UE decodes a second configuration information from the network device. The second configuration information indicates a reference slot and a first slot offset of the first list of slot offsets. The UE generates the AP-SRS for transmission to the network device based on the reference slot and the first slot offset.

20 Claims, 14 Drawing Sheets

(56) References Cited

U.S. PATENT DOCUMENTS

| | | | |
|---|---|---|---|
| 2020/0295903 | A1 | 9/2020 | Faxer |
| 2020/0313816 | A1* | 10/2020 | Sun .................. H04W 74/0808 |
| 2020/0343954 | A1 | 10/2020 | Takeda et al. |
| 2020/0389218 | A1 | 12/2020 | Faxér et al. |
| 2021/0014893 | A1* | 1/2021 | Park ...................... H04W 80/08 |
| 2021/0135725 | A1 | 5/2021 | Kim et al. |
| 2021/0345285 | A1* | 11/2021 | Tenny .................. H04W 24/10 |
| 2021/0376963 | A1 | 12/2021 | Liang et al. |
| 2022/0232535 | A1* | 7/2022 | Abdelghaffar .... H04W 72/0453 |
| 2022/0394754 | A1 | 12/2022 | Ko et al. |
| 2023/0122786 | A1* | 4/2023 | Bang ................. H04W 72/1268 370/329 |
| 2023/0171062 | A1 | 6/2023 | Khoshnevisan et al. |

FOREIGN PATENT DOCUMENTS

| | | |
|---|---|---|
| CN | 111386668 | 7/2020 |
| CN | 111885683 | 11/2020 |
| WO | 2019191871 | 10/2019 |
| WO | 2019213914 | 11/2019 |
| WO | 2020017240 | 1/2020 |

OTHER PUBLICATIONS

3rd Generation Partnership Project; Technical Specification Group Radio Access Network; NR; Physical layer procedures for data (Release 16), 3GPP TS 38.214 V16.5.0, Mar. 2021, 171 pages.

3rd Generation Partnership Project; Technical Specification Group Radio Access Network; NR; Medium Access Control (MAC) protocol specification (Release 16), 3GPP TS 38.321 V16.4.0, Mar. 2021, 157 pages.

3rd Generation Partnership Project; Technical Specification Group Radio Access Network; NR; Radio Resource Control (RRC) protocol specification (Release 16), 3GPP TS 38.331 V16.4.1, Mar. 2021, 949 pages.

CSI Feedback Enhancements for IIoT/URLLC, Ericsson, 3GPP TSG-RAN WG1 Meeting #103-e, Tdoc R1-2007708, Oct. 26-Nov. 13, 2020, 13 pages.

On CSI Feedback in NR, Huawei, 3GPP TSG RAN WG1 Meeting #91, R1-1719834, Nov. 27-Dec. 1, 2017, 5 pages.

Views on URLLC CSI Feedback Enhancements, Apple Inc., 3GPP TSG-RAN WG1 Meeting #104b-e, R1-2103104, Apr. 2020, 8 pages.

International Patent Application No. PCT/CN2021/092293, International Search Report and the Written Opinion, dated Jan. 30, 2022, 9 pages.

Discussion on SRS Enhancement, R1-2101451, 3GPP TSG-RAN WG1 Meeting #104-e, Jan. 19, 2021, 41 pages.

Enhancements on SRS, 3GPP TSG RAN WG1#104-e, R1-2100277, Jan. 25-Feb. 5, 2021, 10 pages.

U.S. Appl. No. 17/439,381, Non-Final Office Action, dated Jul. 21, 2023, 19 pages.

European Patent Application No. 21867888.6, Extended European Search Report, dated May 2, 2023, 10 pages.

3rd Generation Partnership Project; Technical Specification Group Radio Access Network; NR; Multiplexing and channel coding (Release 16), 3GPP TS 38.212 V16.5.0, Mar. 2021, 152 pages.

U.S. Appl. No. 17/439,381, Notice of Allowance, dated Oct. 2, 2023, 11 pages.

International Patent Application No. PCT/CN2021/085488, International Preliminary Report on Patentability, dated Oct. 12, 2023, 5 pages.

International Patent Application No. PCT/CN2021/092293, International Preliminary Report on Patentability, dated Nov. 23, 2023, 6 pages.

* cited by examiner

| R | BWP ID | SERVING CELL ID | | |
|---|---|---|---|---|
| SUL | AP-SRS RESOURCE SET ID | T0 | T1 | T2 |
| ... | | | | |
| TN-8 | TN-7 | TN-6 | TN-5 | TN-4 | TN-3 | TN-2 | TN-1 |
| ... | | | | |
| SUL | AP-SRS RESOURCE SET ID | T0 | T1 | T2 |
| ... | | | | |
| TN-8 | TN-7 | TN-6 | TN-5 | TN-4 | TN-3 | TN-2 | TN-1 |

FIG. 3B

| R | BWP ID | SERVING CELL ID | | | | |
|---|---|---|---|---|---|---|
| SUL | AP-SRS TRIGGER STATE | T0 | T1 | T2 | T3 | T4 |
| ... | | | | | | |
| TN-8 | TN-7 | TN-6 | TN-5 | TN-4 | TN-3 | TN-2 | TN-1 |
| ... | | | | | | |
| SUL | AP-SRS TRIGGER STATE | T0 | T1 | T2 | T3 | T4 |
| ... | | | | | | |
| TN-8 | TN-7 | TN-6 | TN-5 | TN-4 | TN-3 | TN-2 | TN-1 |

FIG. 3C

APERIODIC SRS TRIGGERING MECHANISM ENHANCEMENT

CROSS-REFERENCE TO RELATED APPLICATIONS

This application is a U.S. National Phase of International Application No. PCT/CN2021/085488, filed Apr. 3, 2021, the entire contents and disclosures of which is incorporated herein by reference.

TECHNICAL FIELD

This application relates generally to wireless communication systems, and more specifically to aperiodic (Sounding Reference Signal) SRS triggering mechanism enhancement.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method for a user equipment (UE) is provided that includes: obtaining, from a network device, a first configuration information, wherein the first configuration information indicates a first resource set for an aperiodic Sounding Reference Signal (AP-SRS), and wherein the first resource set for the AP-SRS includes a first list of slot offsets; decoding a second configuration information from the network device, wherein the second configuration information indicates a reference slot and a first slot offset of the first list of slot offsets; and generating the AP-SRS for transmission to the network device based on the reference slot and the first slot offset.

According to an aspect of the present disclosure, a method for a network device is provided that includes: generating a first configuration information for transmission to a user equipment (UE), wherein the first configuration information indicates a first resource set for an aperiodic Sounding Reference Signal (AP-SRS), and wherein the first resource set for the AP-SRS includes a first list of slot offsets; generating a second configuration information for transmission to the UE, wherein the second configuration information indicates a reference slot and a first slot offset of the first list of slot offsets; and obtaining the AP-SRS from the UE, wherein the AP-SRS is transmitted based on the reference slot and the first slot offset.

According to an aspect of the present disclosure, an apparatus for a user equipment (UE) is provided that includes one or more processors configured to perform steps of the method according to the present disclosure.

According to an aspect of the present disclosure, an apparatus of a network device is provided that includes one or more processors configured to perform steps of the method according to the present disclosure.

According to an aspect of the present disclosure, a computer readable medium is provided that has computer programs stored thereon, which when executed by one or more processors, cause an apparatus to perform steps of the method according to the present disclosure.

According to an aspect of the present disclosure, an apparatus for a communication device is provided that includes means for performing steps of the method according to perform steps of the method according to the present disclosure.

According to an aspect of the present disclosure, a computer program product is provided that includes computer programs which, when executed by one or more processors, cause an apparatus to perform steps of the method according to the present disclosure.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

FIG. 3B illustrates an exemplary bitmap for MAC-CE activation in accordance with some embodiments.

FIG. 3C illustrates another exemplary bitmap for MAC-CE activation in accordance with some embodiments.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

In wireless communication, the quality of channel is not as stable as in wired communication. In order to obtain the quality of channel, a base station may require a UE to transmit a Sounding Reference Signal (SRS) to the base station.

It should be note that SRS involves uplink (UL) transmission. If a slot offset for transmitting SRS is predetermined, the slot used for transmitting SRS is also predetermined and thus is fixed. However, in TDD system, the UL slot is limited. When the slot for transmitting SRS is fixed, if it is unavailable (for example, if the slot collides with DL symbols), the UE may skip the transmission of SRS.

Figure 1:
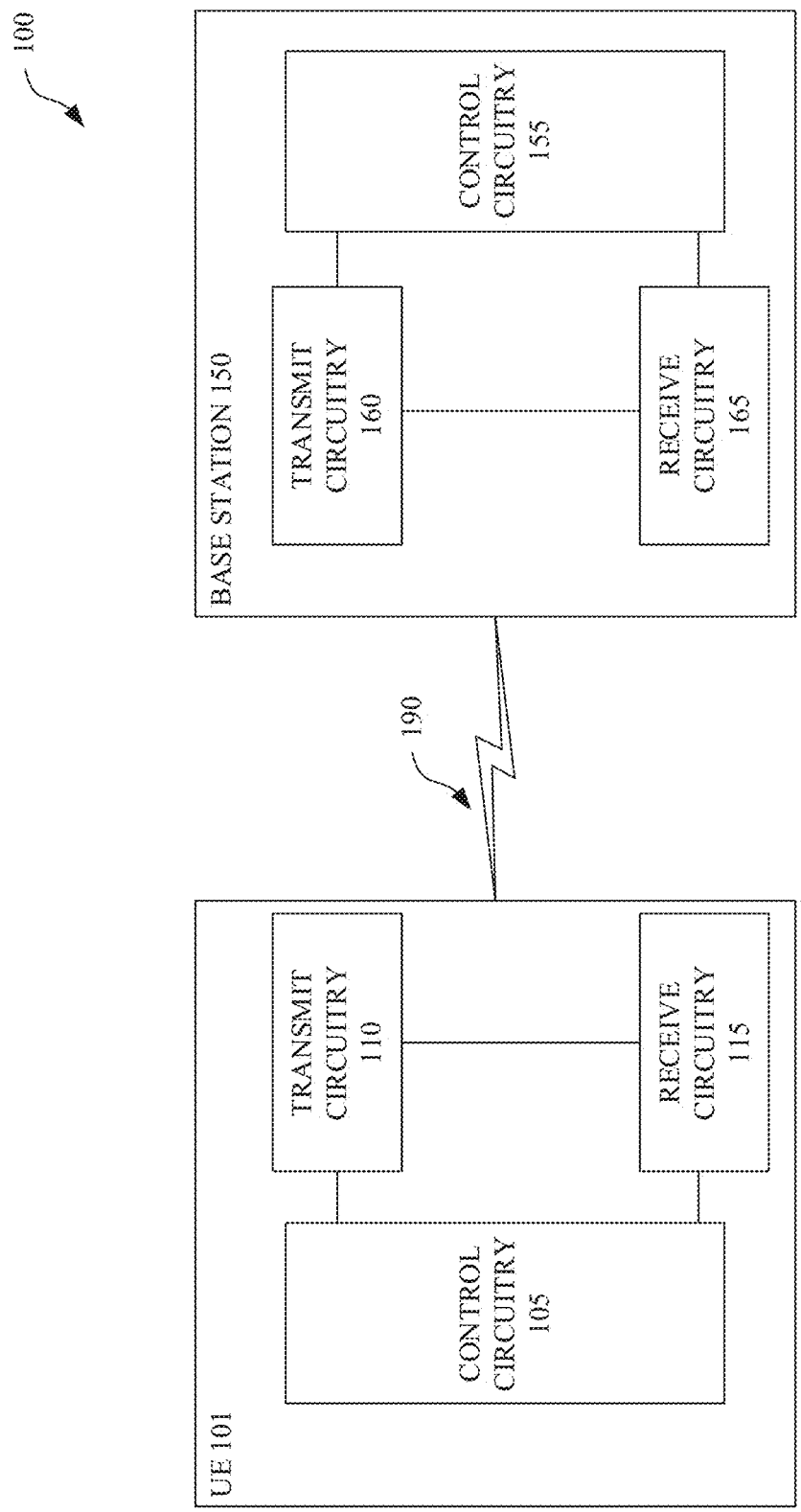
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beam-forming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuity 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g., messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is included of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 163 may receive the plurality of multiplexed uplink physical channels in an uplink super-frame that is included of a plurality of uplink subframes.

As described further below, the control circuitry 105 and 155 may be involved with measurement of a channel quality for the air interface 190. The channel quality may, for example, be based on physical obstructions between the UE 101 and the base station 130, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

The UE and the base station described in the following embodiments may be implemented by the UE 101 and the base station 150 described in FIG. 1.

Figure 2:
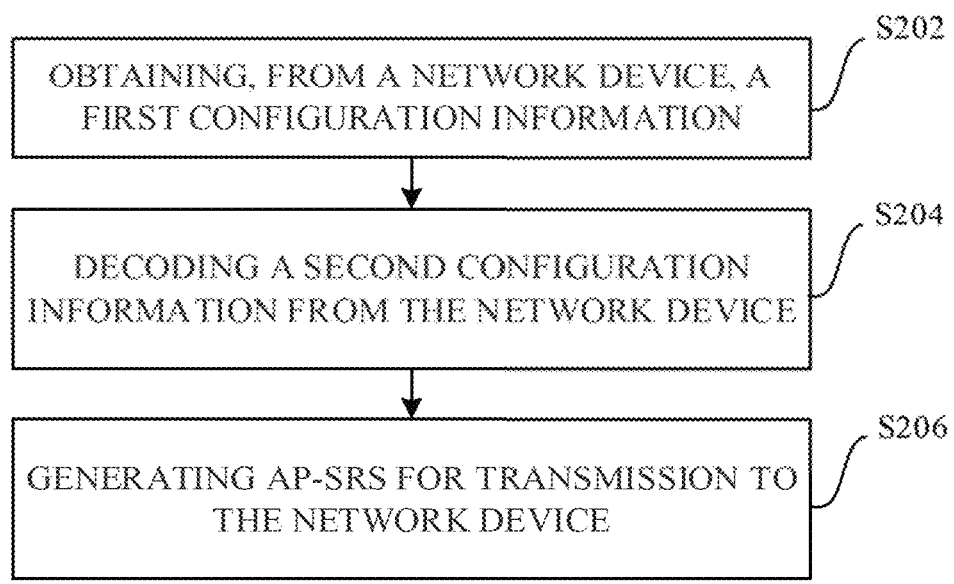
FIG. 2 illustrates a flowchart for an exemplary method for a user equipment in accordance with some embodiments.

FIG. 2 illustrates a flowchart for an exemplary method for a user equipment in accordance with some embodiments. The method 200 illustrated in FIG. 2 may be implemented by the UE 101 described in FIG. 1.

In some embodiments, the method 200 for UR may include the following steps: S202, obtaining, from a network device, a first configuration information, wherein the first configuration information indicates a first resource set for an aperiodic Sounding Reference Signal (AP-SRS), and wherein the first resource set for the AP-SRS includes a first list of slot offsets; S204, decoding a second configuration information from the network device, wherein the second configuration information indicates a reference slot and a first slot offset of the first list of slot offsets; and S206, generating the AP-SRS for transmission to the network device based on the reference slot and the first slot offset.

According to some embodiments of the present disclosure, with a first configuration information, a first list of slot offsets including a plurality of slot offsets rather than a single slot offset can be configured by a network device or pre-defined in the specification. With a second configuration information to be decoded by the UE, a first slot offset can be selected from the first list of slot offsets, such that the first slot offset is selectable instead of being fixed. In this way, the transmission of AP-SRS for the UE is more flexible. Since multiple choices of slot offset of a list of slot offsets are provided, even if some slots for transmitting the AP-SRS is unavailable (for example, if the slot for transmitting AP-SRS collides with DL symbols), slot offsets in the first list of slot offsets corresponding to other available slots can be considered and thus the UE will not skip the transmission of AP-SRS, thereby improving the flexibility of the transmission of the AP-SRS.

In the following, each step of the method 200 will be described in details.

At step S202, the UE obtains, from a network device, a first configuration information, wherein the first configuration information indicates a first resource set for an aperiodic Sounding Reference Signal (AP-SRS), and wherein the first resource set for the AP-SRS includes a first list of slot offsets.

According to some embodiments, Sounding Reference (SRS) may include the following three types: (1) periodic SRS, (2) semi-persistent SRS and (3) aperiodic SRS (AP-SRS).

Periodic SRS indicates that SRS is periodically transmitted from the UE to the base station. For example, a periodic SRS may be transmitted from the UE to the base station every N millisecond (ms), wherein N may be any positive number.

Semi-persistent SRS indicates that SRS is periodically transmitted from the UE to the base station, but the activation of the transmission of SRS can be controlled. For example, a Semi-persistent SRS may be transmitted from the UE to the base station every N millisecond where N may be any positive number, but the activation of this transmission may be configured by the network device.

Aperiodic SRS (AP-SRS) indicates that SRS is aperiodically transmitted from the UE to the base station. Compared with periodic SRS and semi-persistent SRS, the latency for AP SRS is shorter. In addition, since AP-SRS is not transmitted periodically, compared with periodic SRS and semi-persistent SRS, AP SRS is more flexible.

According to some embodiments, AP-SRS requires resources for transmitting the AP-SRS. In some embodiments, a first resource set for AP-SRS may be configured by network device through a first configuration information. It should be note that, although a first resource set for AP-SPR is described herein for purpose of clarity, the present disclosure does not intent to limit the expression of "the resource set for AP-SRS" as one resource set for AP-SRS. In fact, according to the present disclosure, one or more resource sets for AP-SRS may be configured by network device through a first configuration information.

According to some embodiments, the first configuration information may include a Radio Resource Control (RRC) signaling, but the present disclosure does not limit thereto. According to some embodiments, the first configuration information may be any other information, message or signaling that is suitable for configuring the first resource set for AP-SRS.

According to some embodiments, the first resource set for AP-SRS may contain resources that are required by transmitting the AP-SRS. In some embodiments, slot offset of AP-SRS may be configured in the first resource set for AP-SRS.

According to some embodiments, the slot offset may participate in determining the time (i.e., the slot) to transmit the AP-SRS. Slot offset is an offset of slots from a reference slot. For example, if the reference slot is $X^{th}$ slot and the slot offset is Y, then the slot for UE to transmit the AP-SRS may be determined based on the reference slot $X^{th}$ slot and the slot offset Y, where X and Y are positive integers. The determination of the reference slot will be described below along with step S204.

In related art, one slot offset may be configured in a resource set for AP-SRS. An exemplary method for configuring the one slot offset (bolded) is shown as follows.

```
SRS=ResourceSet : :=      SEQUENCE {
  srs-ResourceSetId       SRS-ResourceSetId,
  srs-ResourceIdList      SEQUENCE (SIZE(1 . . . maxNrofSRS-
ResourcesPerSet)) OF SRS-ResourceId
  resource Type           CHOICE{
  aperiodic                    SEQUENCE {
    aperiodicSRS-ResourceTrigger   INTEGER (1 . . .
maxNrofSRS-TriggerStates-1),
    csi-RS                       NZP-CSI-RS-ResourceId
NonCodebook
    slotOffset                   INTEGER (1 . . . 32)
  . . .,
  [[
    aperiodicSRS-ResourceTriggerList   SEQUENCE (SIZE
(1 . . .maxNrofSRS-TriggerStates-2))
                                       OF INTEGER (1 . . .
maxNrofSRS-TriggerStates-1) OPTIONAL
    ]]
  }.
```

It should be note that AP-SRS involves uplink (UL) transmission. Since only one slot offset for transmitting AP-SRS is configured in the resource set for AP-SRS in the related art, the slot used for transmitting SRS is fixed relative to the reference slot. However, in TDD system, the UL slot is limited. When the slot for transmitting AP-SRS is fixed, if it is unavailable (for example, if the slot for transmitting AP-SRS collides with DL symbols), the UE will skip the transmission of AP-SRS.

According to some embodiments, a first list of slot offsets may be configured in the first resource set for the AP-SRS. It should be note that, although a first list of slot offsets is described for purpose of clarity, the present disclosure does not intent to limit the expression of "the list of slot offsets" as one list of slot offsets. In fact, according to the present disclosure, one or more list of slot offsets may be configured by network device through a first configuration information.

According to some embodiments, the first list of slot offsets may include a plurality of entries. Each entry of the first list of slot offsets may indicate one slot offset. For example, the first list of slot offsets may include 3 (or any integer numbers of) entries [slot offset 0, slot offset 1, slot offset 2]. Note that slot offset i represents the $i^{th}$ entry of the first list of slot offsets, but does not mean that the value of slot offset i equals to i. According to some examples, the value of slot offset i in the first list of slot offsets may be configured by the network device through the first configuration information.

According to some embodiments, the size of the first list of slot offsets may be configured. Note that the size of the first list of slot offsets represents the number of entries included in the first list of slot offsets. The number of entries included in the first list of slot offsets may be any positive integer. For example, if the first list of slot offsets includes 3 entries, then the size of the first list of slot offsets is 3. As another example, if the first list of slot offsets includes 64 entries, then the size of the first list of slot offsets is 64.

In some embodiments, the maximum size of the first list of slot offsets may be predetermined. For example, the maximum size of the first list of slot offsets may be determined by a parameter maxNrofAperodicSRS-SlotOffsets. An exemplary configuration of the first list of slot offsets is shown as follows.

```
AperodicSRS-SlotOffsetList ::= SEQUENCE (SIZE(1..maxNrofAperodicSRS-SlotOffsets)) OF AperodicSRS-SlotOffset
AperodicSRS-SlotOffset ::= SEQUENCE {
  slotOffset INTEGER (1..32)
}
```

In case that the SRS to be transmitted is an AP-SRS, the configuration of the first list of slot offsets may be added into the first resource set for AP-SRS. An exemplary addition of the first list of slot offsets into the first resource set for AP-SRS is shown as follows.

```
SRS-ResourceSet ::= SEQUENCE {
  srs-ResourceSetId SRS-ResourceSetId,
  srs-ResourceIdList SEQUENCE (SIZE(1. .maxNrofSRS-ResourcesPerSet)) OF SRS-ResourceId
  resourceType CHOICE {
    aperiodic SEQUENCE {
    aperiodicSRS-ResourceTrigger INTEGER (1..maxNrofSRS-TriggerState-1),
    csi-RS NZP-CSI-RS-ResourceId OPTIONAL, -- Cond NonCodebook |
    slotOffset INTEGER (1..32) OPTIONAL, -- Need S
    AperodicSRS-SlotOffsetList SetupRelease (AperodicSRS-SlotOffsetList)
```

At step S204, the UE decodes a second configuration information from the network device, wherein the second configuration information indicates a reference slot and a first slot offset of the first list of slot offsets.

According to some embodiments, the second configuration information may include a Downlink Control information (DCI), but the present disclosure does not limit thereto. According to some embodiments, the second configuration information tray be any other information, message or signaling that is suitable for triggering AP-SRS.

According to some embodiments, the reference slot is the slot when the second configuration information is received by the UE. In some embodiments, the UE may determine the reference slot by decoding the second configuration information.

According to some embodiments, the second configuration information indicates a first slot offset of the first list of slot offsets. In other words, the network device may select a first slot offset from the first list of slot offsets, and apply the selected first slot offset for determining the transmission of the AP-SRS. For example, the first list of slot offsets may include 3 entries {slot offset 0, slot offset 1, slot offset 2}, wherein slot offset 0 may be 1, slot offset 1 may be 4, and slot offset 2 may be 8, and the first slot offset can be selected from slot offset 0, slot offset 1 and slot offset 2. If the first slot offset is selected as slot offset 0, the first slot offset equals to 1. If the first slot offset is selected as slot offset 1, the first slot offset equals to 4. If the first slot offset is selected as slot offset 2, the first slot offset equals to 8.

According to some embodiments, the UE determines the first slot offset of the first list of slot offsets by decoding the second configuration information. In some embodiments, when the second configuration information is a DCI, then a field of slot offset indicating the first slot offset may be included in the DCI. By decoding the DCI including a field of slot offset, the UE can determine the first slot offset of the first list of slot offsets. In other embodiments, when the second configuration information is not a DCI, then a field of slot offset indicating the first slot offset may also be included in the second configuration information.

At step S206, the UE generates the AP-SRS for transmission to the network device based on the reference slot and the first slot offset.

According to some embodiments, the slot for transmission the AP-SRS from UE to network device may be determined based on the reference slot and the first slot offset. As discussed above, if the reference slot is $X^{th}$ slot and the first slot offset is Y, then the slot for UE to transmit the AP-SRS may be determined based or the reference slot $X^{th}$ slot and the first slot offset Y, where X and Y are positive integers.

In some embodiments, the slot for transmission the AP-SRS from UE to network device may be determined by adding the first slot offset to the reference slot, but the present disclosure does not limit thereto. In other words, if the reference slot is $X^{th}$ slot and the first slot offset is Y, then the slot for transmission the AP-SRS is $(X+Y)^{th}$ slot, where X and Y are positive integers. For example, if the reference slot is slot 11 and the first slot offset is 1, then the slot for transmission the AP-SRS is slot 12 (=11+1). As another example, if the reference slot is slot 11 and the first slot offset is 8, then the slot for transmission the AP-SRS is slot 19 (=11+8). As can be seen, the slot for transmission the AP-SRS is determined based on the selection of the first slot offset.

According to some embodiments, the first resource set for AP-SRS may be included in the AP-SRS for transmission to the network device.

According to some embodiments of the present disclosure, with a first configuration information, a first list of slot offsets including a plurality of slot offsets rather than a single slot offset can be configured by a network device. With a second configuration information to be decoded by the UE, a first slot offset can be selected from the first list of slot offsets, such that the first slot offset is selectable instead of being fixed. In this way, the transmission of AP-SRS for the UE is more flexible. Since multiple choices of slot offset of a list of slot offsets are provided, even if some slots for transmitting the AP-SRS is unavailable (for example, if the slot for transmitting AP-SRS collides with DL symbols), slot offsets in the first list of slot offsets corresponding to other available slots can be considered and thus the UE will not skip the transmission of AP-SRS, thereby improving the flexibility of the transmission of the AP-SRS.

As discussed above, in the related art, a single slot offset (hereinafter, referred to as a remaining slot offset) rather than a list of slot offsets may be already included in the first resource set for the AP-SRS. In this case, the first resource set for the AP-SRS may include both the first list of slot offsets and the remaining slot offset.

According to some embodiments, the first list of slot offsets and the remaining slot offset can be configured at the same time.

According to some embodiments, the first resource set for the AP-SRS may further include a remaining slot offset, and wherein generating the AP-SRS for transmission to the network device based on the reference slot and the first slot offset may include: generating the AP-SRS for transmission to the network device based on the reference slot, the remaining slot offset and the first slot offset.

In some embodiments, generating the AP-SRS for transmission to the network device based on the reference slot, the remaining slot offset and the first slot offset may include: determining a first slot by adding the remaining slot offset to the reference slot; determining a second slot by adding the first slot offset to the first slot; and generating the AP-SRS for transmission to the network device at the second slot.

For example, if the reference slot $X^{th}$ slot, the remaining slot offset is Z, and the first slot offset is Y, then the first slot is $(X+Z)^{th}$ slot and the second slot is $(X+Y+Z)^{th}$ slot, where X, Y and Z are positive integers. In this example, the slot for transmission the AP-SRS is the second slot, i.e., $(X+Y+Z)^{th}$ slot. For example, if the reference slot is slot 11, the remaining slot offset is 1 and the first slot offset is 1, then the first slot is slot 12 (=11+1), while the second slot and the slot for transmission the AP-SRS are slot 13 (=11+1+1). As another example, if the reference slot is slot 11, the remaining slot offset is 1, and the first slot offset is 8, then the first slot is also slot 12 (=11+1), while the second slot and the slot for transmission the AP-SRS is slot 20 (=11+1+8).

According to some embodiments, the first slot may include any slot or merely include any available slot, while the second slot may include any slot or merely include any available slot.

It should be note that any slot may include any available slot and any unavailable slot. An "available slot" is a slot satisfying there are UL or flexible symbol(s) for the time-domain location(s) for all the SRS resources (for example, resource for AP-SRS) in the resource set (for example, the resource set for AP-SRS) and it satisfies UE capability on the minimum timing requirement between triggering PDCCH and all the SRS resources (for example, resource for AP-SRS) in the resource set (for example, the resource set for AP-SRS).

In some examples, the remaining slot offset is determined such that the first slot includes any slot, and the first slot offset is determined such that the second slot includes any available slot.

Taking slots 12, 13, 19 and 20 as an example (in this example, only slots 12, 13, 19 and 20 are considered), it is assumed that slots 12 and 20 are available slots, while slots 13 and 19 are unavailable slots. If the reference slot is slot 11, since the remaining slot offset is determined such that the first slot includes any slot (including any available slot and any unavailable slot), the first slot can be any of slot 12, 13, 19 and 20, and thus the remaining slot offset can be any of 1 (=12−11), 2 (=13−11), 8 (=19−11) and 9 (=20−11). In this case, further assuming that the remaining slot offset is 1 (which means the first slot is slot 12), since the first slot offset is determined such that the second slot includes any available slot (does not includes any unavailable slot), the second slot can be slot 20 but cannot be slot 13 and 19, and thus the first slot offset can be 8 (=20−12) but cannot be 1 (=13−12) or 7 (=19−12).

In other examples, the remaining slot offset is determined such that the first slot includes any available slot, and the first slot offset is determined such that the second slot includes any available slot.

Taking slots 12, 13, 19 and 20 as an example (in this example, only slots 12, 13, 19 and 20 are considered) again, it is assumed that slots 12 and 20 are available slots, while slots 13 and 19 are unavailable slots. If the reference slot is slot 11, since the remaining slot offset is determined such that the first slot includes any available slot (does not includes any unavailable slot), the first slot can be 12 or 20 but cannot be 13 or 19. and thus the remaining slot offset can be 1 (=12−11) or 9 (=20−11), but cannot be 2 (=13−11) or 8 (=19−11). In this case, further assuming that the remaining slot offset is 1 (which means the first slot is slot 12), since the first slot offset is determined such that the second slot includes any available slot (does not includes any unavailable slot), the second slot can be slot 20 but cannot be slot 13 and 19, and thus the first slot offset can be 8 (=20−12) but cannot be 1 (=13−12) or 7 (=19−12).

According to some embodiments of the present disclosure, the first list of slot offsets and the remaining slot offset can be configured at the same time, and meanwhile a first slot offset can also be selected the from the first list of slot offsets, thereby improving the flexibility of transmission of the AP-SRS and meanwhile avoiding any conflict caused by configuring two kinds of slot offset.

In other embodiments, generating the AP-SRS for transmission to the network device based on the reference slot, the remaining slot offset and the first slot offset may also include: determining a first slot by adding the first slot offset to the reference slot; determining a second slot by adding the remaining slot offset to the first slot; and generating the AP-SRS for transmission to the network device at the second slot.

According to some embodiments, the first list of slot offsets and the remaining slot offset cannot be configured at the same time.

In some embodiments, the first list of slot offsets is configured, while the remaining slot offset is not configured. In this case, the slot for transmitting the AP-SRS may be determined based on the reference slot and the first slot offset selected from the first list of slot offsets. For example, the slot for transmitting the AP-SRS may be determined by adding the first slot offset selected from the first list of slot offsets to the reference slot.

In some embodiments, the first list of slot offsets is not configured, while the remaining slot offset is configured. In this case, the slot for transmitting the AP-SRS may be determined based on the reference slot and the remaining slot offset. For example, the slot for transmitting the AP-SRS may be determined by adding the remaining slot offset to the reference slot.

According to some embodiments of the present disclosure, only one of the first list of slot offsets and the remaining slot offset can be configured, thereby avoiding any conflict caused by configuring two kinds of slot offset.

According to some embodiments, a plurality of trigger states for AP-SRS may be introduced for determining the AP-SRS. For example, there are may be four trigger states in total, such as trigger state 0, trigger state 1, trigger state 2 and trigger state 3, wherein trigger state 0 refers to not triggering of the transmission of the AP-SRS, while trigger state 1, trigger state 2 and trigger state 3 refer to triggering the transmission of the AP-SRS.

As discussed above, one or more resource sets for AP-SRS may be configured by the first configuration information. According to some embodiments, the first resource set for AP-SRS may indicate a relation between the first resource set for AP-SRS and one trigger state of the plurality of trigger states for AP-SRS. In some embodiments, there are three resource sets for AP-SRS, wherein resource set 1 for AP-SRS indicates that resource set 1 for AP-SRS is associated with trigger state 1, resource set 2 for AP-SRS indicates that resource set 2 for AP-SRS is associated with trigger state 2, resource set 3 for AP-SRS indicates that resource set 3 for AP-SRS is associated with trigger state 3.

According to some embodiments, the second configuration information may indicate a trigger state among a plurality trigger states. For example, if the second configuration information indicates the trigger state is trigger state 0, then the AP-SRS will not be transmitted. If the second configuration information indicates the trigger state is trigger state 1, then resource set 1 for AP-SRS that is associated. with trigger state 1 may be triggered and may be transmitted to the network device. If the second configuration information indicates the trigger state is trigger state 2, then resource set 2 for AP-SRS that is associated with trigger state 2 may be triggered and may be transmitted to the network device. If the second configuration information indicates the trigger state is trigger state 3, then resource set 3 for AP-SRS that is associated with trigger state 3 may be triggered and may be transmitted to the network device.

In some embodiments, when the second configuration information is DCI, the DCI may include a field of trigger state for AP-SRS. The field of trigger state far AP-SRS may occupy 2 bits and indicate four cases: 00, 01, 10 and 11. If the field of trigger state for AP-SRS indicate "00", then the transmission of AP-SRS will not be triggered and will not be transmitted to the network device. If the field of trigger state for AP-SRS indicate "01", it may refer to trigger state 1 that is associated with resource set 1 for AP-SRS. If the field of trigger state for AP-SRS indicate "10", it may refer to trigger state 2 that is associated with resource set 2 for AP-SRS. If the field of trigger state for AP-SRS indicate "11", it may refer to trigger state 3 that is associated with resource set 3 for AP-SRS.

According to some embodiments, one trigger state for AP-SRS may be mapped to more than one resource set for AP-SRS.

According to some embodiments, the first configuration information may further indicate a second resource set for the AP-SRS, and wherein the second resource set for the AP-SRS includes a second list of slot offsets, and wherein the first configuration information further indicates that the first resource set for the AP-SRS and the second resource set for the AP-SRS are mapped to a same trigger state for the AP-SRS. According to some embodiments, the first resource set for the AP-SRS and the second resource set for the AP-SRS may be triggered for transmission to the network device according to the same trigger state for the AP-SRS.

For example, the first resource set for the AP-SRS may be resource set 1 for AP-SRS and may indicate that resource set 1 for AP-SRS is associated with trigger state 1, while the second resource set for the AP-SRS may be resource set 2 for AP-SRS and may indicate that resource set 2 for AP-SRS is also associated with trigger state 1.

According to some embodiments of the present disclosure, by mapping a plurality of resource sets for AP-SRS to a single trigger state for AP-SRS, a plurality of resource sets for AP-SRS may be triggered at the same time by only one second configuration information and then may be transmitted to the network device, thereby improving, the efficiency of triggering the transmission of the AP-SRS.

According to some embodiments, the number of slot offsets in the list of slot offsets of each resource set for AP-SRS may be the same. In some embodiments, the number of slot offsets in the first list of slot offsets may be the same as the number of slot offsets of the second list of slot offsets.

For example, list 1 of slot offsets of resource set 1 for AP-SRS may include 8 entries of slot offset, and list 2 of slot offsets of resource set 2 for AP-SRS may also include 8 entries of slot offset. In this example, if the second configuration information indicates slot offset 2, the slot for transmitting resource set 1 is determined based on slot offset 2 of list 1 of slot offsets, and the slot for transmitting resource set 2 is determined based on slot offset 2 of list 2 of slot offsets. It should be emphasized herein again that slot offset 2 of list 1 of slot offsets means the second entry of list 1 of slot offsets (rather than slot offset=2), and the slot offset for resource set 1 for AP-SRS is determined on the value of the second entry (i.e., slot offset 2) of list 1 of slot offsets. For example, if the reference slot is slot 11, slot offset 2 of list 1 of slot offsets is 4, and slot offset 2 of list 2 of slot offsets is 8, then by only one second configuration information, resource set 1 for AP-SRS may be transmitted to the network device at slot 15 (=11+4) and resource set 2 for AP-SRS may be transmitted to the network device at slot 19 (=11+8).

According to some embodiments of the present disclosure, since one second configuration information can only indicate one entry from the list of slot offsets, by further equally configuring the size (i.e., the number of entries) of lists of slot offsets of different resource sets for AP-SRS, it is ensured that a slot offset can be selected from each list of slot offsets of different resource sets for AP-SRS.

According to some embodiments, the number of slot offsets in the list of slot offsets of each resource set for AP-SRS may be different. In some embodiments, the number of slot offsets in the first list of slot offsets is different from the number of slot offsets of the second list of slot offsets.

In sortie embodiments, list 1 of slot offsets of resource set 1 for AP-SRS may include M entries of slot offset, and list 2 of slot offsets of resource set 2 for AP-SRS may also include N entries of slot offset, where M and N are positive integers and M<N.

As discussed above, one second configuration information can only indicate one entry from the list of slot offsets. Considering that the field of slot offset in the second configuration information is binary, the minimum size of the field of slot offset in the second configuration information required for indicating any entry of list 1 of slot offsets of resource set 1 for AP-SRS is $\lceil \log_2(M) \rceil$ and the minimum size of the field of slot offset in the second configuration information required for indicating any entry of list 2 of slot offsets of resource set 2 for AP-SRS is $\lceil \log_2(N) \rceil$.

In some embodiments, if the actual size of the field of slot offset in the second configuration information equals to $\lceil \log_2(M) \rceil$, any entry in list 2 of slot offsets with index number larger than M will not be triggered by the network device.

In some embodiments, if the actual size of the field of slot offset in the second configuration information equals to $\lceil \log2(N) \rceil$ and the second configuration information indicates an entry with index number larger than M, there may be two options. As an option, resource set 1 for AP-SRS is not triggered. As another option, resource set 1 for AP-SRS is triggered but the slot offset selected from list 1 of slot offsets is fixed. For example, the slot offset selected from list 1 of slot offsets may be fixed as slot offset M (i.e., the last entry of list 1 of slot offsets). In other examples, the slot offset selected from list 1 of slot offsets may be fixed as any slot offset i, where i is a positive integer and i<M.

According to some embodiments of the present disclosure, with the above configuration, even if the number of slot offsets in the list of slot offsets of each resource set for AP-SRS are different, these resource sets for AP-SRS can be triggered or not triggered accordingly, without causing any conflict.

According to some embodiments, one resource set for AP-SRS may be mapped to a plurality of trigger states for AP-SRS. In some embodiments, the first configuration information may further indicate that the first resource set for the AP-SRS is mapped to multiple trigger states for the AP-SRS. In other words, each trigger state of multiple trigger states indicated by the second configuration information can trigger the first resource set for the AP-SRS.

In some embodiments, the first list of slot offsets may be associated with the multiple trigger states for the AP-SRS. For example, resource set 1 for AP-SRS may include a single list 1 of slot offsets, and the single list 1 of slot offsets may be mapped to multiple trigger states for AP-SRS, such as trigger state 1, trigger state 2 and trigger state 3.

According to some embodiments of the present disclosure, only one list of slot offsets is needed to be configured for multiple trigger states, thereby improving the efficiency of slot offset configuration.

In some embodiments, the first resource set for the AP-SRS may include multiple lists of slot offsets, and wherein each list of slot offsets of the multiple lists of slot offsets one-to-one corresponds to one trigger state of the multiple trigger states for the AP-SRS. For example, resource set 1 for AP-SRS may include list 1 of slot offsets, list 2 of slot offsets, and list 3 of slot offsets, wherein list 1 of slot offsets corresponds to trigger state 1, list 2 of slot offsets corresponds to trigger state 2, and list 3 of slot offsets corresponds to trigger state 3.

According to some embodiments, the method of the UE may further include: Step S203 (as illustratively shown as 603 in FIG. 6), obtaining, from the network device, a third configuration information, wherein the third configuration information activates a subset of the first list of slot offsets, and wherein the second configuration information indicates the first slot offset from the subset of the first list of slot offsets.

According to some embodiments, the third configuration information may include Media Access Control Control Element (MAC-CE) information, but the present disclosure does not limit thereto. According to some embodiments, the third configuration information may be any other information, message or signaling that is suitable for configuring the first resource set for AP-SRS.

According to some embodiment, the UE may receive the third configuration information from the network device after receiving the first configuration information but before receiving and decoding the second configuration information.

Hereinafter, an exemplary method is described with reference to FIG. 3A.

Figure 3A:
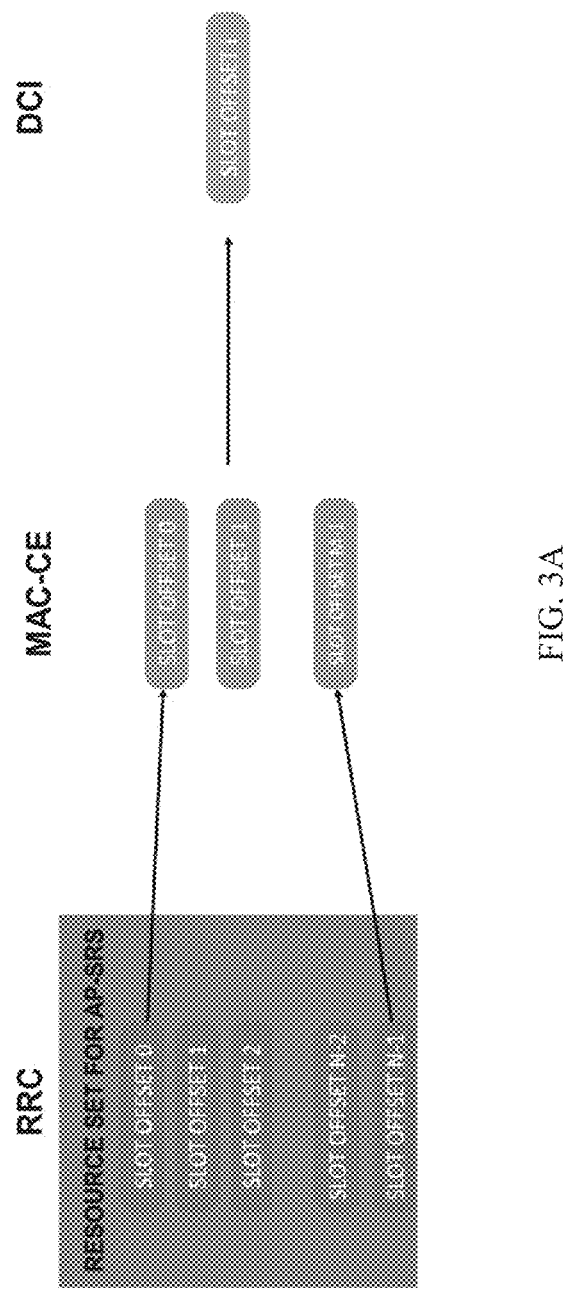
FIG. 3A illustrate a diagram for exemplary Media Access Control Control Element (MAC-CE) activation in accordance with some embodiments.

FIG. 3A illustrate a diagram for exemplary Media Access Control Control Element (MAC-CE) activation in accordance with some embodiments.

In FIG. 3A, a RRC signaling is illustratively shown on the left as an example of the first configuration information, a MAC-CE is illustratively shown in the middle as an example of the third configuration information, and a DCI is illustratively shown on the right as an example of the second configuration information.

It can be seen in FIG. 3A that the resource set for AP-SRS in the RRC signaling includes a list of slot offsets, wherein the list of slot offsets further includes N slot offsets {slot offset 0, slot offset 1, . . . , slot offset N-1}, and where N is a positive integer. As discussed above, MAC-CE may activate M slot offsets out of N slot offsets of the list of slot offsets, where M and N are positive integers and M<N. In other words, M slot offset activated by MAC-CE is a subset of N slot offset configured by RRC signaling. Then, DCI may indicate one slot offset out of the subset of slot offset (including M slot offsets that are activated by MAC-CE) as the first slot offset for the transmission of AP-SRS.

As can be seen, without MAC-CE, the DCI indicate 1 out of N slot offsets directly in one step, and with MAC-CE activating M out of N slot offsets, the indication of 1 out of N slot offsets can be divided into two steps. The MAC-CE acts as if a "buffer". With MAC-CE, the size of field of slot offset in DCI can be reduced.

For example, assuming that M=8 and N=64, if there is a MAC-CE as if a "buffer", the size of field of slot offset in DCI is 3 (=$\log_2[8]$) bits, otherwise, if there is not a MAC-CE as a "buffer", the size of field of slot offset in DCI is 6 (=$\log2[64]$) bits. In this example, 3 bits can be reduced for DCI. Note that the total size of a DCI is usually about 60 bits, and thus saving 3 bits for the field of slot offset can greatly reduce overhead and improve the capacity of DCI since the DCI may have more space for storing other fields.

According to some embodiments of the present disclosure, with a third configuration information, on one hand, the size required by the field of slot offset in the second configuration information (e.g., DCI) can be reduced, thereby reducing overhead and improve the capacity of the second configuration information since the second configuration information may have more space for storing other fields, and on the other hand, the second configuration information can still indicate one slot offset from a list of slot offsets, thereby improving the flexibility of the transmission of the AP-SRS.

The subset of the first list of slot offsets (e.g., M out of N slot offsets) may be activated by the following two ways.

According to some embodiments, with reference to FIG. 3B, the subset of the first list of slot offsets may be activated per resource set for the AP-SRS. FIG. 3B illustrates an exemplary bitmap for MAC-CE activation of list of slot offsets in accordance with some embodiments.

As shown in FIG. 3B, "R" represents a reserved bit and occupies 1 bit. "BWP ID" indicates the bandwidth part (BWP) and occupies 2 bits. "Serving Cell ID" indicates the serving cell and occupies 5 bits. "SUL" occupies 1 bit and represents supplemental uplink, which is used to indicate whether it is SUL (supplemental uplink) or NUL (normal uplink). "AP SRS Resource Set ID" indicates the resource set for AP-SRS and occupies 4 bits. "Ti (i=1, 1, . . . , N-1)" represents bitmaps for the entries of the list of slot offsets indicated in the first configuration information (e.g., RRC signaling). For example, T0 represents slot offset 0, T1 represents slot offset 1, and TN-1 represents slot offset N-1, wherein if the value of Ti in bitmap is 0, it means the slot offset i is not activated and if the value of Ti in bitmap is 1, it means the slot offset i is activated.

According to some embodiments, multiple resource sets for AP-SRS may be indicated in a same MAC-CE.

According to some embodiments of the present disclosure, in accordance with the bitmap as shown in FIG. 3B, MAC-CE can activate a subset (e.g., including M slot offsets) of the list of slot offsets (e.g., including N slot offsets) per resource set for AP-SRS.

According to some embodiments, with reference to FIG. 3C, the subset of the first list of slot offsets may be activated per trigger state for the AP-SRS. FIG. 3C illustrates another exemplary bitmap for MAC-CE activation of list of slot offsets in accordance with some embodiments.

As shown in FIG. 3C, "R" represents a reserved bit and occupies 1 bit. "BWF ID" indicates the bandwidth part (BWP) and occupies 2 bits. "Serving Cell ID" indicates the serving cell and occupies 5 bits. "SUL" occupies 1 bit and represents supplemental uplink, which is used to indicate whether it is SUL (supplemental uplink) or NUL (normal uplink). "AP-SRS Trigger State" indicates the trigger state for AP-SRS and occupies 2 bits. Note that if the second configuration information is DCI, there are four trigger states of AR-SRS, and 2 bits are enough for representing the four trigger states. "Ti (i=0, 1, . . . , N-1)" represents bitmaps for the entries of the list of slot offsets indicated in the first configuration information (e.g., RRC signaling). For example, T0 represents slot offset 0, T1 represents slot offset 1, and TN-1 represents slot offset N-1, wherein if the value of Ti in bitmap is 0, it means the slot offset i is not activated. and if the value of Ti in bitmap is 1, it means the slot offset i is activated.

According to some embodiments, multiple trigger states of AR-SRS may be indicated in a same MAC-CE. In some embodiments, all the resource sets for AP-SRS associated with the same trigger state for AP-SRS may be activated in the same bitmap.

For example, compared with the bitmap as shown in FIG. 3B, the bits occupied by "AP-SRS Trigger State" (e.g., 2 bits) in FIG. 3C is less than the bits occupied by "AP SRS Resource Set ID" (e.g., 4 bits). In this example, several bits (e.g., 2 bits) may be saved for containing more entries of slot offset.

According to some embodiments of the present disclosure, in accordance with the bitmap as shown in FIG. 3C, MAC-CE can activate a subset (e.g., including M slot offsets) of the list of slot offsets (e.g., including N slot offsets) per trigger state for AP-SRS, and capacity of MAC-CE can be further reduced compared with FIG. 3C.

Figure 4:
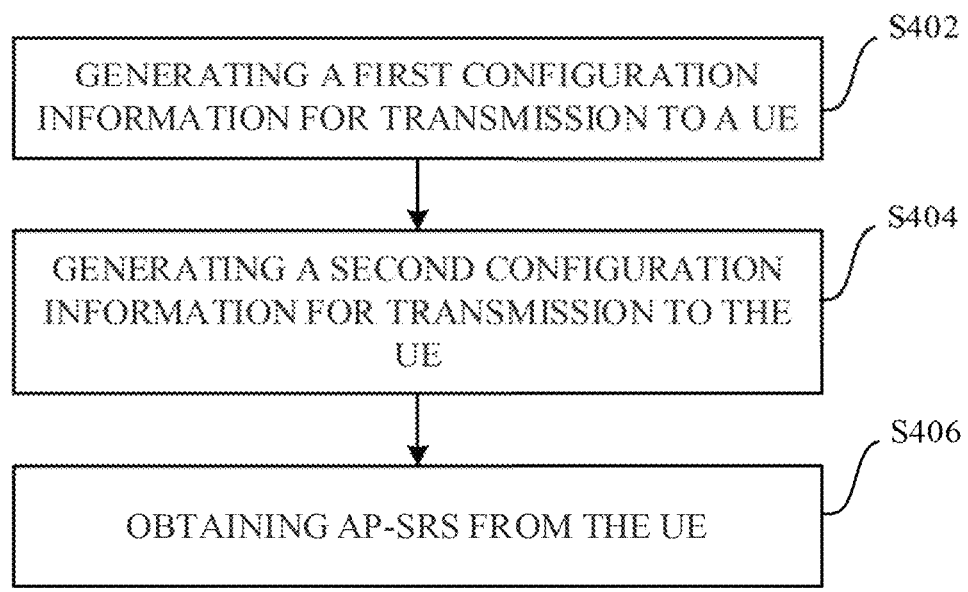
FIG. 4 illustrates a flowchart for an exemplary method for a network device in accordance with some embodiments.

FIG. 4 illustrates a flowchart for an exemplary method for a network device in accordance with some embodiments. The method 400 illustrated in FIG. 4 may be implemented by the base station 150 described in FIG. 1. For example, the network device may be the network device of the base station 150.

In some embodiments, the method 400 for a network device may include the following steps: S402, generating a first configuration information for transmission to a user equipment (UE), wherein the first configuration information indicates a first resource set for an aperiodic Sounding Reference Signal (AP-SRS), and wherein the first resource set for the AP-SRS includes a first list of slot offsets; S404, generating a second configuration information for transmission to the UE, wherein the second configuration information indicates a reference slot and a first slot offset of the first list of slot offsets; and S406, obtaining the AP-SRS from the UP wherein the AP-SRS is transmitted based on the reference slot and the first slot offset.

In the following, each step of the method 400 will be described. Note that those elements, expressions, features etc. that have already been described with reference to FIG. 2 and its corresponding description (about UE) are omitted herein for clarity.

At step S402, the network device generates a first configuration information for transmission to a user equipment (UE), wherein the first configuration information indicates a first resource set for an aperiodic Sounding Reference Signal (AP-SRS), and wherein the first resource set for the AP-SRS includes a first list of slot offsets.

According to some embodiments, the first configuration information may include a Radio Resource Control (RRC) signaling.

At step S404, the network device generates a second configuration information for transmission to the UE, wherein the second configuration information indicates a reference slot and a first slot offset of the first list of slot offsets.

According to some embodiments, the second configuration information may include a Downlink Control information (DCI).

At step S406, the network device obtains the AP-SRS from the UE, wherein the AP-SRS is transmitted based on the reference slot and the first slot offset.

According to some embodiments of the present disclosure, with a first configuration information, a first list of slot offsets including a plurality of slot offsets rather than a single slot offset can be configured by a network device. With a second configuration information to be decoded by the UE, a first slot offset can be selected from the first list of slot offsets, such that the first slot offset is selectable instead of being fixed. In this way, the transmission of AP-SRS for the UE is more flexible. Since multiple choices of slot offset of a list of slot offsets are provided, even if some slots for transmitting the AP-SRS is unavailable (for example, if the slot for transmitting AP-SRS collides with DL symbols), slot offsets in the first list of slot offsets corresponding to other available slots can be considered and thus the UE will not skip the transmission of AP-SRS, thereby improving the flexibility of the transmission of the AP-SRS.

According to some embodiments, the method of network device may include: Step S403 (as illustratively shown as 603 in FIG. 6), generating a third configuration information, wherein the third configuration information activates a subset of the first list of slot offsets, and wherein the second configuration information indicates the first slot offset from the subset of the first list of slot offsets.

According to some embodiments, the third configuration information may include Media Access Control Control Element (MAC-CE) information.

Note that those elements, expressions, features etc. that have already been described with reference to FIGS. 3A, 3B, 3C and their corresponding description (about UE) are omitted herein for clarity.

According to some embodiments of the present disclosure, with a third configuration information, on one hand, the size required by the field of slot offset in the second configuration information (e.g., DCI) can be reduced, thereby reducing overhead and improve the capacity of the second configuration information since the second configuration information may have more space for storing other fields, and on the other hand, the second configuration information can still indicate one slot offset from a list of slot offsets, thereby improving the flexibility of the transmission of the AP-SRS.

Figure 5:
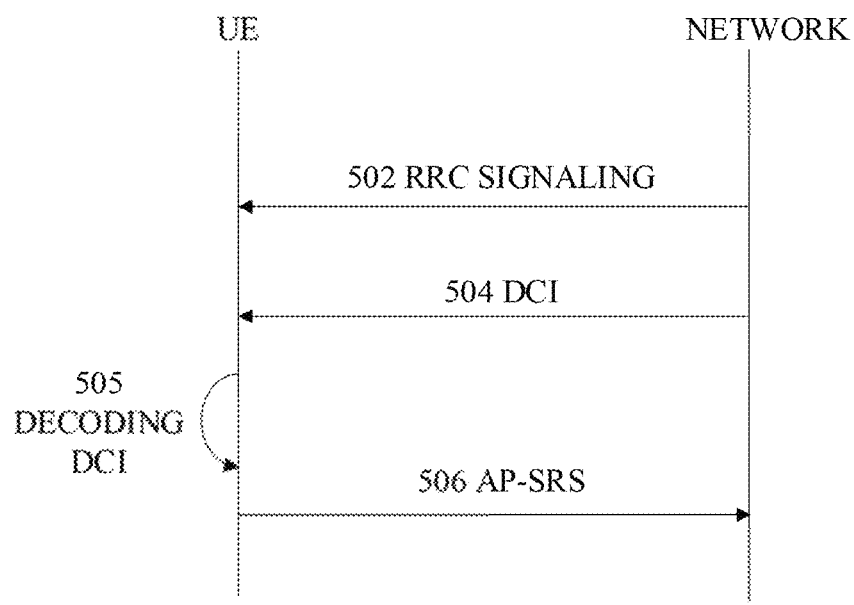
FIG. 5 illustrates a flowchart for exemplary steps for AP-SRS configuration in accordance with some embodiments.

FIG. 5 illustrates a flowchart for exemplary steps for AP-SRS configuration in accordance with some embodiments.

In FIG. 5, the steps of the method for UE and the method for network device during the triggering of AP-SRS by RRC signaling and DCI are shown.

At Step 502, the network device may transmit a RRC signaling to the UE, wherein the RRC signaling indicates one or more resource sets for AP-SRS, and wherein the one or more resource sets for the AP-SRS include one or more lists of slot offsets. Step 502 can be implemented according to the description with reference to Step S202 and/or Step S402.

At Step 504, the network device may transmit a DCI to the UE. At Step 505, the UE may decode the DCI to obtain a reference slot and a slot offset selected from the one or more lists of slot offsets that are received through the RRC signaling. Step 504 and Step 505 can be implemented according to the description with reference to Step S204 and/or Step S404.

At Step 506, the UE may transmit the AP-SRS to the network device, wherein the slot for transmission of the AP-SRS is determined based on the reference slot and the slot offset selected from the one or more lists of slot offsets. Step 506 can be implemented according to the description with reference to Step S206 and/or Step S406.

Figure 6:
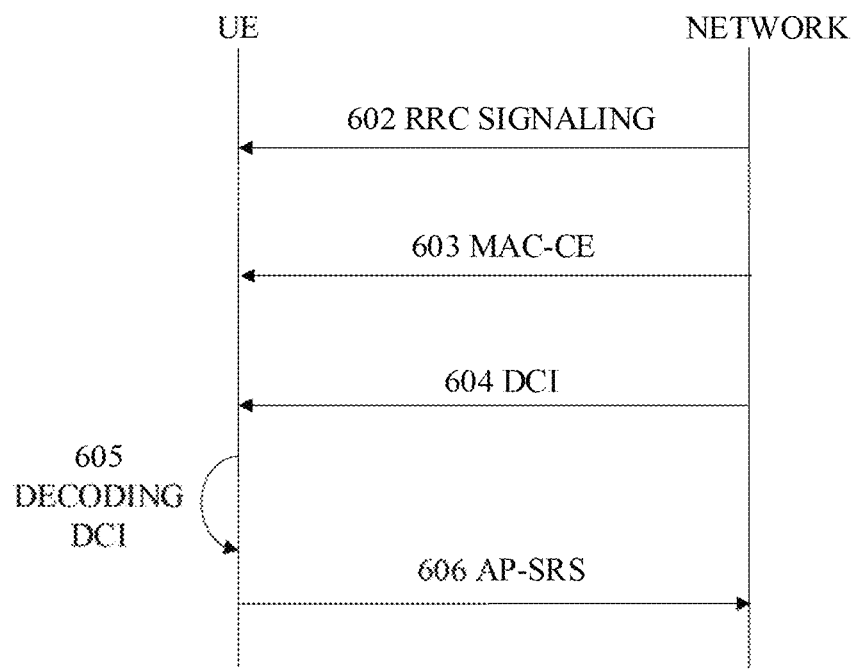
FIG. 6 illustrates a flowchart for exemplary steps for AP-SRS configuration in accordance with some embodiments.

FIG. 6 illustrates a flowchart for exemplary steps for AP-SRS configuration in accordance with some embodiments.

In FIG. 6, the steps of the method for UE and the method for network device during the triggering of AP-SRS by RRC signaling, MAC-CE and DCI are shown.

At Step 602, the network device may transmit a RRC signaling to the UE, wherein the RRC signaling indicates one or more resource sets for AP-SRS, and wherein the one or more resource sets for the AP-SRS include one or more lists of slot offsets. Step 602 can be implemented according to the description with reference to Step S202 and/or Step S402.

At Step 603, the network device may transmit a MAC-CE to the UE, wherein the MAC-CE activates a subset of slot offsets selected from the one or more lists of slot offsets. Step 603 can be implemented according to the description with reference to Step S203 and/or Step S403.

At Step 604, the network device may transmit a DCI to the UE. At Step 605, the UE may decode the DCI to obtain a reference slot and a slot offset of the subset of slot offsets that are activated by MAC-CE. Step 604 and Step 605 can be implemented according to the description with reference to Step S204 and/or Step S404.

At Step 606, the UE may transmit the AP-SRS to the network device, wherein the slot for transmission of the AP-SRS is determined based on the reference slot and the slot offset selected from the activated subset of slot offsets, which is further selected from the one or more lists of slot offsets. Step 606 can be implemented according to the description with reference to Step S206 and/or Step S406.

Figure 7:
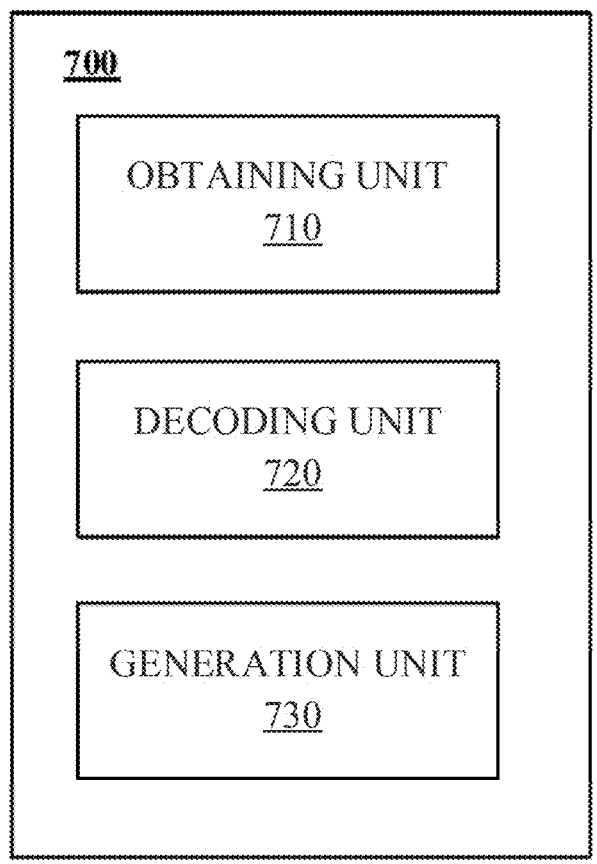
FIG. 7 illustrates an exemplary block diagram of an apparatus far a UE in accordance with some embodiments.

FIG. 7 illustrates an exemplary block diagram of an apparatus for a UE in accordance with some embodiments. The apparatus 700 illustrated in FIG. 7 may be used to implement the method 200 as illustrated in combination with FIG. 2.

As illustrated in FIG. 7, the apparatus 700 includes an obtaining unit 710, a decoding unit 720 and a generation unit 730.

The obtaining unit 710 may be configured to obtain, from a network device, a first configuration information, wherein the first configuration information indicates a first resource set for an aperiodic Sounding Reference Signal (AP-SRS), and wherein the first resource set for the AP-SRS includes a first list of slot offsets.

The decoding unit 720 may be configured to decode a second configuration information from the network device, wherein the second configuration information indicates a reference slot and a first slot offset of the first list of slot offsets.

The generation unit 730 may be configured to generate the AP-SRS for transmission to the network device based on the reference slot and the first slot offset.

According to the embodiments of the present application, with a first configuration information, a first list of slot offsets including a plurality of slot offsets rather than a single slot offset can be configured by network. With a second configuration information to be decoded by the UE, a first slot offset can be selected from the first list of slot offsets, such that the first slot offset is not predetermined and fixed. In this way, the transmission of AP-SRS for the UE is more flexible. Since multiple choices of slot offset of a list of slot offsets are provided, even if some slots for transmitting the AP-SRS is unavailable (for example, if the slot for transmitting AP-SRS collides with DL symbols), the UE can have other choices and will not skip the transmission of AP-SRS, thereby improving the flexibility of the transmission of the AP-SRS.

Figure 8:
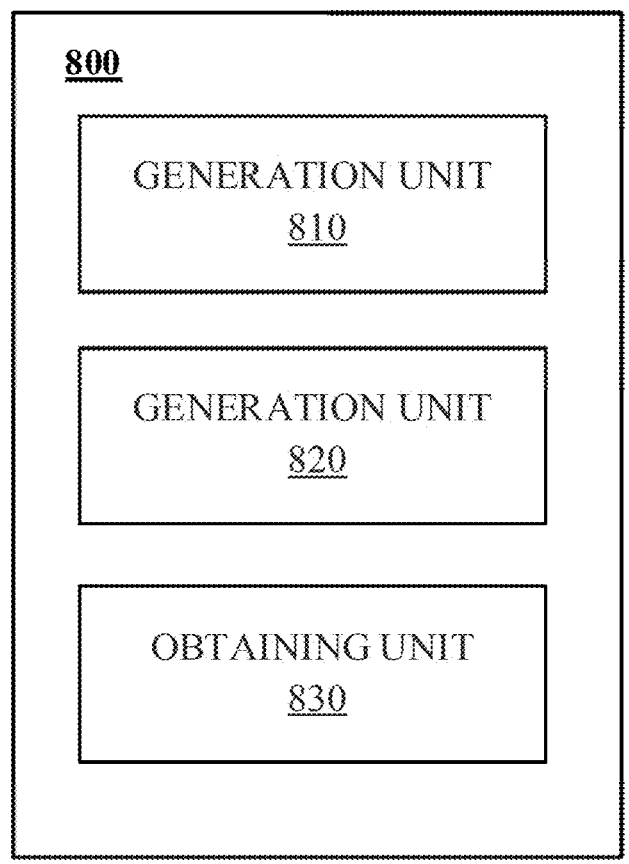
FIG. 8 illustrates an exemplary block diagram of an apparatus for a network device in accordance with same embodiments.

FIG. 8 illustrates an exemplary block diagram of an apparatus a network device in accordance with some embodiments. The apparatus 800 illustrated in FIG. 8 may be used to implement the method 400 as illustrated in combination with FIG. 4.

As illustrated in FIG. 8, the apparatus 800 includes a generation unit 810, a generation unit 820 and an obtaining unit 830.

The generation unit 810 may be configured to generate a first configuration information for transmission to a user equipment (UE), wherein the first configuration information indicates a first resource set for aperiodic Sounding Reference Signal (AP-SRS), and wherein the first resource set for the AF-SRS includes a first list of slot offsets.

The generation unit 820 may be configured to generate a second configuration information for transmission to the UE, wherein the second configuration information indicates a reference slot and a first slot offset of the first list of slot offsets.

The obtaining unit 830 may be configured to obtain the AP-SRS from the UE, wherein the AP-SRS is transmitted based on the reference slot and the first slot offset.

According to some embodiments of the present disclosure, with a first configuration information, the network can a first list of slot offsets including a plurality of slot offsets rather than a single slot offset. With a second configuration information to be decoded by the UE, the network can select a first slot offset from the first list of slot offsets, such that the first slot offset is not predetermined and fixed. In this way, the transmission of AP-SRS for the UE is more flexible. Since multiple choices of slot offset of a list of slot offsets are provided, even if some slots for transmitting the AP-SRS is unavailable (for example, if the slot for transmitting AP-SRS collides with DL symbols), the UE can have other choices and will not skip the transmission of AP-SRS, thereby improving, the flexibility of the transmission of the AP-SRS.

Figure 9:
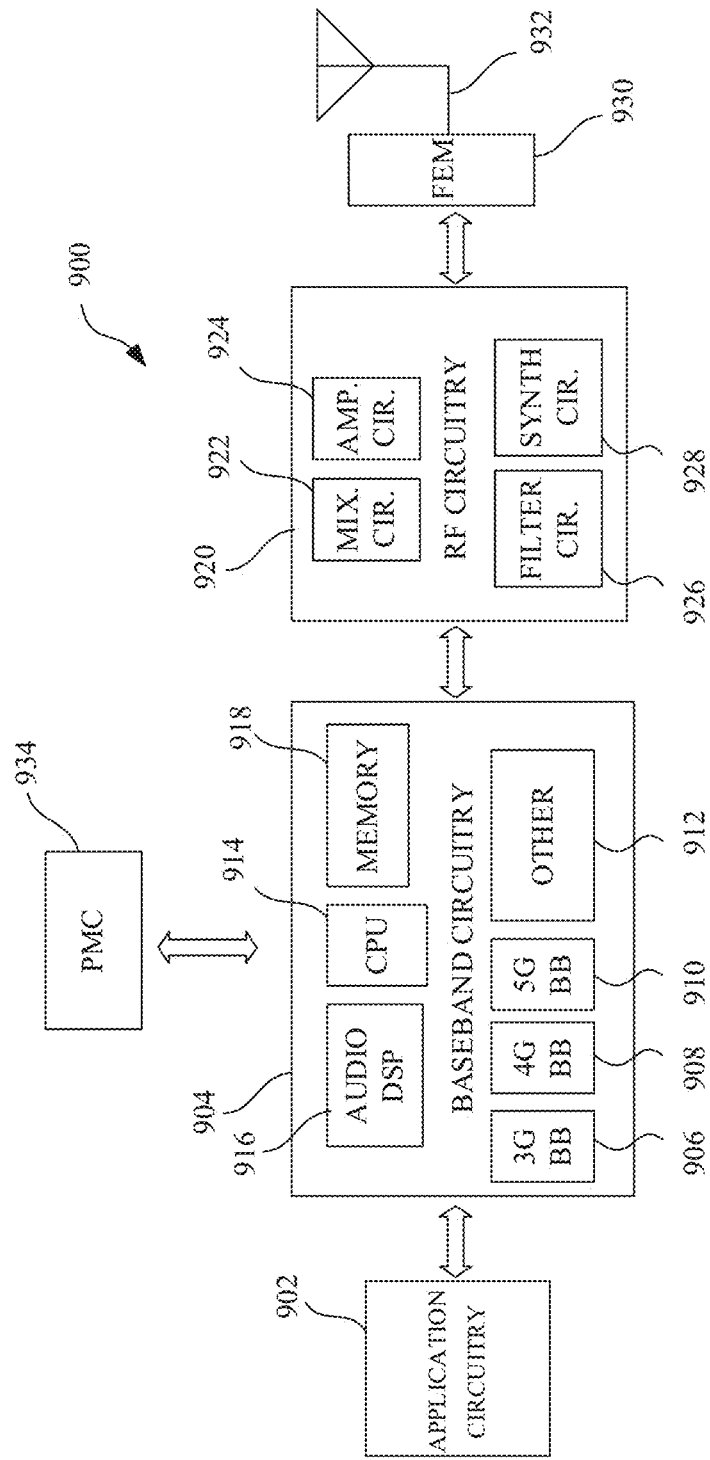
FIG. 9 illustrates example components of a device in accordance with some embodiments.

FIG. 9 illustrates example components of a device 900 in accordance with some embodiments. In some embodiments, the device 900 may include application circuitry 902, baseband circuitry 904, Radio Frequency (RE) circuitry (shown as RF circuitry 920), front-end module (FEM) circuitry (shown as FEM circuitry 930), one or more antennas 932, and power management circuitry (PMC) (shown as PMC 934) coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RE circuitry 920 and to generate baseband signals for a transmit signal path of the RF circuitry 920. The baseband circuitry 904 may interface with the application circuitry 902 for generation and processing of the baseband signals and for controlling operations of the RF circuitry 920. For example, in some embodiments, the baseband circuitry 904 may include a third generation (3G) baseband processor (3G baseband processor 906), a fourth generation (4G) baseband processor (4G baseband processor 908), a fifth generation (5G) baseband processor (5G baseband processor 910), or other baseband processor(s) 912 for other existing generations, generations in development or to be developed in the future (e.g., second generation (2G), sixth generation (6G), etc.). The baseband circuitry 904 (e.g., one or more of baseband processors) may handle various radio control functions that enable communication with one or more radio networks via the RF circuitry 920. In other embodiments, some or all of the functionality of the illustrated baseband processors may be included in modules stored in the memory 918 and executed via a Central Processing ETnit (CPET 914). The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include a digital signal processor (DSP), such as one or more audio DSP(s) 916. The one or more audio DSP(s) 916 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

The RE circuitry 920 may enable communication with wireless networks using modulated electromagnetic radiation through a non-solid medium. In various embodiments, the RF circuitry 920 may include switches, filters, amplifiers, etc. to facilitate the communication with the wireless network. The RF circuitry 920 may include a receive signal path which may include circuitry to down-convert RF signals received from the FEM circuitry 930 and provide baseband signals to the baseband circuitry 904. The RF circuitry 920 may also include a transmit signal path which may include circuitry to up-convert baseband signals provided by the baseband circuitry 904 and provide RF output signals to the FEM circuitry 930 for transmission.

In some embodiments, the receive signal path of the RF circuitry 920 may include mixer circuitry 922, amplifier circuitry 924 and filter circuitry 926. In some embodiments, the transmit signal path of the RF circuitry 920 may include filter circuitry 926 and mixer circuitry 922. The RF circuitry 920 may also include synthesizer circuitry 928 for synthesizing a frequency for use by the mixer circuitry 922 of the receive signal path and the transmit signal path. In some embodiments, the mixer circuitry 922 of the receive signal path may be configured to down-convert RF signals received from the FEM circuitry 930 based on the synthesized frequency provided by synthesizer circuitry 928. The amplifier circuitry 924 may be configured to amplify the down-converted signals and the filter circuitry 926 may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 922 of the receive signal path may include passive mixers, although the scope of the embodiments is not limited in this respect.

In some embodiments, the mixer circuitry 922 of the transmit signal path may be configured to up-convert input baseband signals based on the synthesized frequency provided by the synthesizer circuitry 928 to generate RF output signals for the FEM circuitry 930. The baseband signals may be provided by the baseband circuitry 904 and may be filtered by the filter circuitry 926.

In some embodiments, the mixer circuitry 922 of the receive signal path and the mixer circuitry 922 of the transmit signal path may include two or more mixers and may be arranged for quadrature downconversion and upconversion, respectively. In some embodiments, the mixer circuitry 922 of the receive signal path and the mixer circuitry 922 of the transmit signal path may include two or more mixers and may be arranged for image rejection (e.g., Hartley image rejection). In some embodiments, the mixer circuitry 922 of the receive signal path and the mixer circuitry 922 may be arranged for direct downconversion and direct upconversion, respectively. In some embodiments, the mixer circuitry 922 of the receive signal path and the mixer circuitry 922 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 920 may include analog-to-digital converter (ADC) and digital-to-analog converter (DAC) circuitry and the baseband circuitry 904 may include a digital baseband interface to communicate with the RF circuitry 920.

In some dual-mode embodiments, a separate radio IC circuitry may be provided for processing signals for each spectrum, although the scope of the embodiments is not limited in this respect.

In some embodiments, the synthesizer circuitry 928 may be a fractional-N synthesizer or a fractional N/N+1 synthesizer, although the scope of the embodiments is not limited in this respect as other types of frequency synthesizers may be suitable. For example, synthesizer circuitry 928 may be a delta-sigma synthesizer, a frequency multiplier, or a synthesizer including a phase-locked loop with a frequency divider.

The synthesizer circuitry 928 may be configured to synthesize an output frequency for use by the mixer circuitry 922 of the RF circuitry 920 based on a frequency input and a divider control input. In some embodiments, the synthesizer circuitry 928 may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 928 of the RF circuitry 920 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 928 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 920 may include an IQ/polar converter.

The FEM circuitry 930 may include a receive signal path which may include circuitry configured to operate on RF signals received from one or more antennas 932, amplify the received signals and provide the amplified versions of the received signals to the RF circuitry 920 for further processing. The FEM circuitry 930 may also include a transmit signal path which may include circuitry configured to amplify signals for transmission provided by the RF circuitry 920 for transmission by one or more of the one or more antennas 932. In various embodiments, the amplification through the transmit or receive signed paths may be done solely in the RF circuitry 920, solely in the FEM circuitry 930, or in both the RF circuitry 920 and the FEM circuitry 930.

In some embodiments, the FEM circuitry 930 may include a TX/RX switch to switch between transmit mode and receive mode operation. The FEM circuitry 930 may include a receive signal path and a transmit signal path. The receive signal path of the FEM circuitry 930 may include an LNA to amplify received RF signals and provide the amplified received RF signals as an output (e.g., to the RF circuitry 920). The transmit signal path of the FEM circuitry 930 may include a power amplifier (PA) to amplify input RF signals (e.g., provided by the RF circuitry 920), and one or more filters to generate RF signals for subsequent transmission (e.g., by one or more of the one or more antennas 932).

In some embodiments, the PMC 934 may manage power provided to the baseband circuitry 904. In particular, the PMC 934 may control power-source selection, voltage scaling, battery charging, or DC-to-DC conversion. The PMC 934 may often be included when the device 900 is capable of being powered by a battery, for example, when the device 900 is included in an EGE. The PMC 934 may increase the power conversion efficiency while providing desirable implementation size and heat dissipation characteristics.

FIG. 9 shows the PMC 934 coupled only with the baseband circuitry 904. However, in other embodiments, the PMC 934 may be additionally or alternatively coupled with, and perform similar power management operations for, other components such as, but not limited to, the application circuitry 902, the RF circuitry 920, or the FEM circuitry 930.

In some embodiments, the PMC 934 may control, or otherwise be part of, various power saving mechanisms of the device 900. For example, if the device 990 is in an RRC Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 994, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data convergence protocol (PDCP) layer, described in further detail below. As referred to herein, Layer 1 may include a physical (PHY) layer of a UE/RAN node, described in further detail below.

Figure 10:
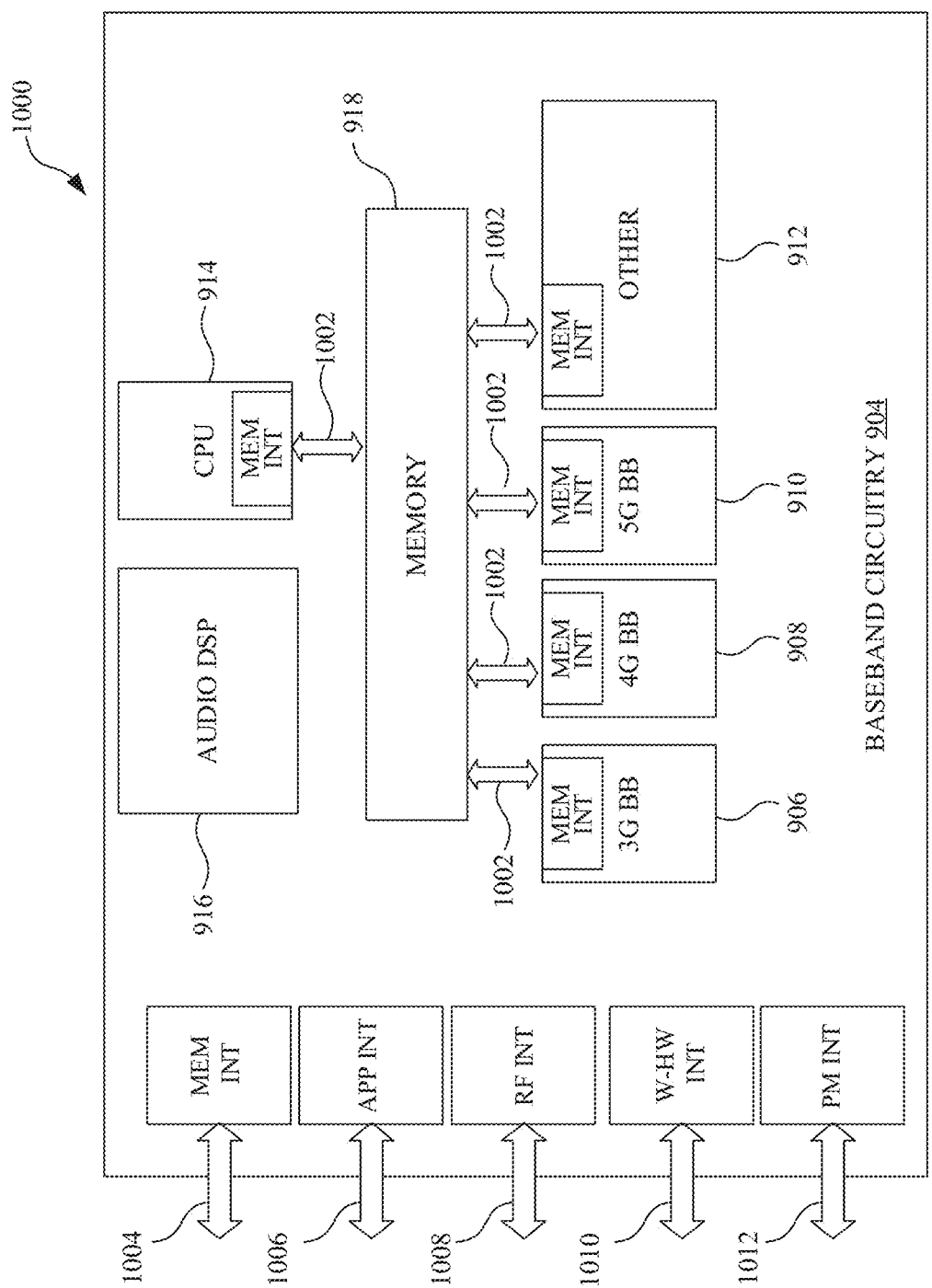
FIG. 10 illustrates example interfaces of baseband circuitry in accordance with some embodiments.

FIG. 10 illustrates example interfaces 1000 of baseband circuitry in accordance with some embodiments. As discussed above, the baseband circuitry 904 of FIG. 9 may include 3G baseband processor 906, 4G baseband processor 908, 5G baseband processor 910, other baseband processor(s) 912, CPU 914, and a memory 918 utilized by said processors. As illustrated, each of the processors may include a respective memory interface 1002 to send/receive data to/front the memory 918.

The baseband circuitry 904 may further include one or more interfaces to communicatively couple to other circuitries/devices, such as a memory interface 1004 (e.g., an interface to send/receive data to/from memory external to the baseband circuitry 904), an application circuitry interface 1006 (e.g., an interface to send/receive data to/from the application circuitry 902 of FIG. 9), an RF circuitry interface 1008 (e.g., an interface to send/receive data to/from RF circuitry 920 of FIG. 9), a wireless hardware connectivity interface 1010 (e.g., an interface to send/receive data to/from Near Field Communication (NFC) components, Bluetooth® components (e.g., Bluetooth® Low Energy), Wi-Fi® components, and other communication components), and a power management interface 1012 (e.g., an interface to send/receive power or control signals to/from the PMC 934.

Figure 11:
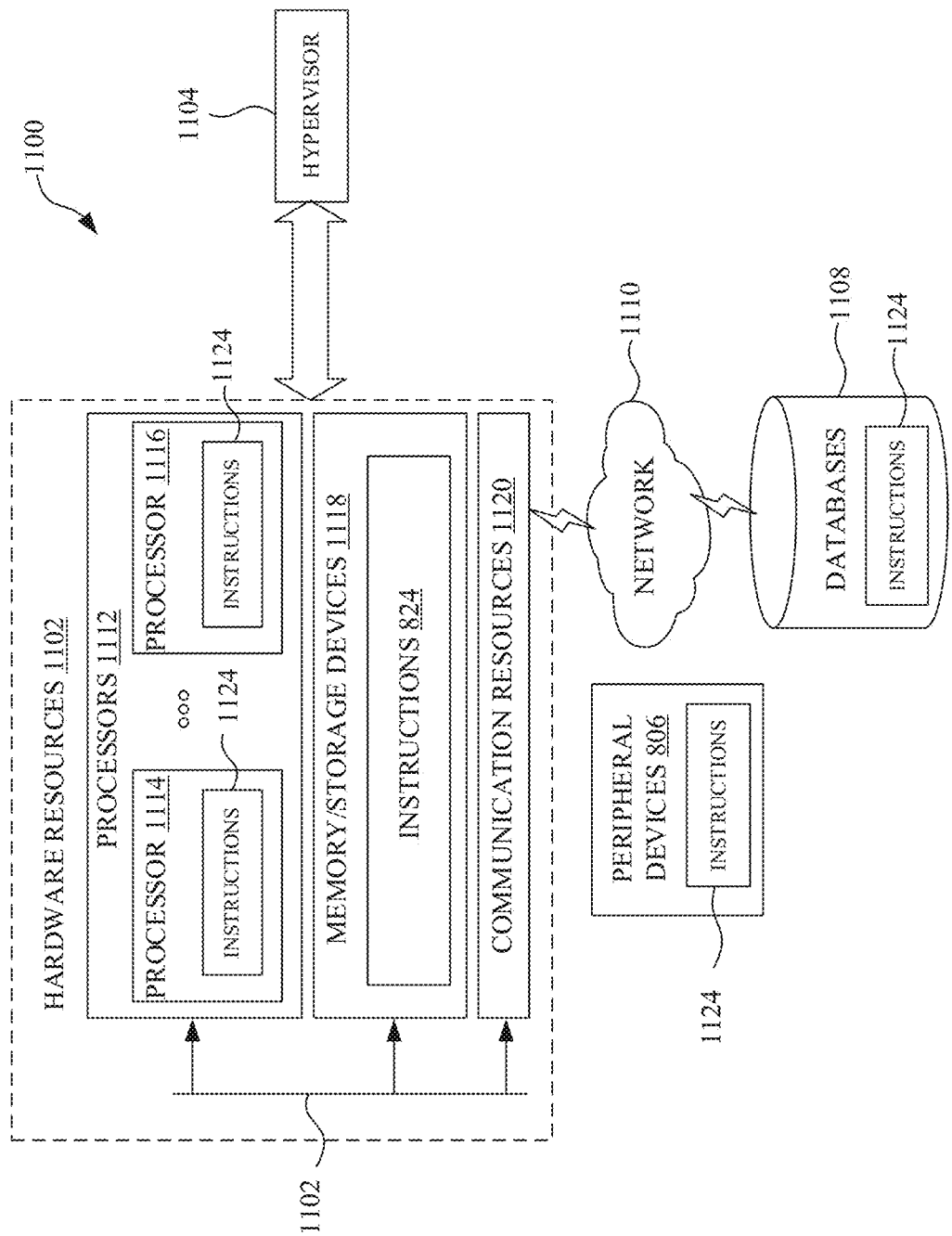
FIG. 11 illustrates components in accordance with some embodiments.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed. herein. Specifically, FIG. 11 shows a diagrammatic representation of hardware resources 1102 including one or more processors 1112 (or processor cores), one or more memory/storage devices 1118, and one or more communication resources 1120, each of which may be communicatively coupled via a bus 1122. For embodiments where node virtualization (e.g., NFV) is utilized, a hypervisor 1104 may be executed to provide an execution environment for one or more network slices/sub-slices to utilize the hardware resources 1102.

The processors 1112 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1114 and a processor 1116.

The memory/storage devices 1118 may include main memory, disk storage, or any suitable combination thereof. The memory/storage devices 1118 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1120 may include interconnection or network interface components or other suitable devices to communicate with one or more peripheral devices 1106 or one or more databases 1108 via a network 1110. For example, the communication resources 1120 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1124 may include software, a program, an application, an applet, an app, or other executable code for causing at least any of the processors 1112 to perform any one or more of the methodologies discussed herein. The instructions 1124 may reside, completely or partially, within at least one of the processors 1112 (e.g., within the processor's cache memory), the memory/storage devices 1118, or any suitable combination thereof. Furthermore, any portion of the instructions 1124 may be transferred to the hardware resources 1102 from any combination of the peripheral devices 1106 or the databases 1108. Accordingly, the memory of the processors 1112, the memory/storage devices 1118, the peripheral devices 1106, and the databases 1108 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 12:
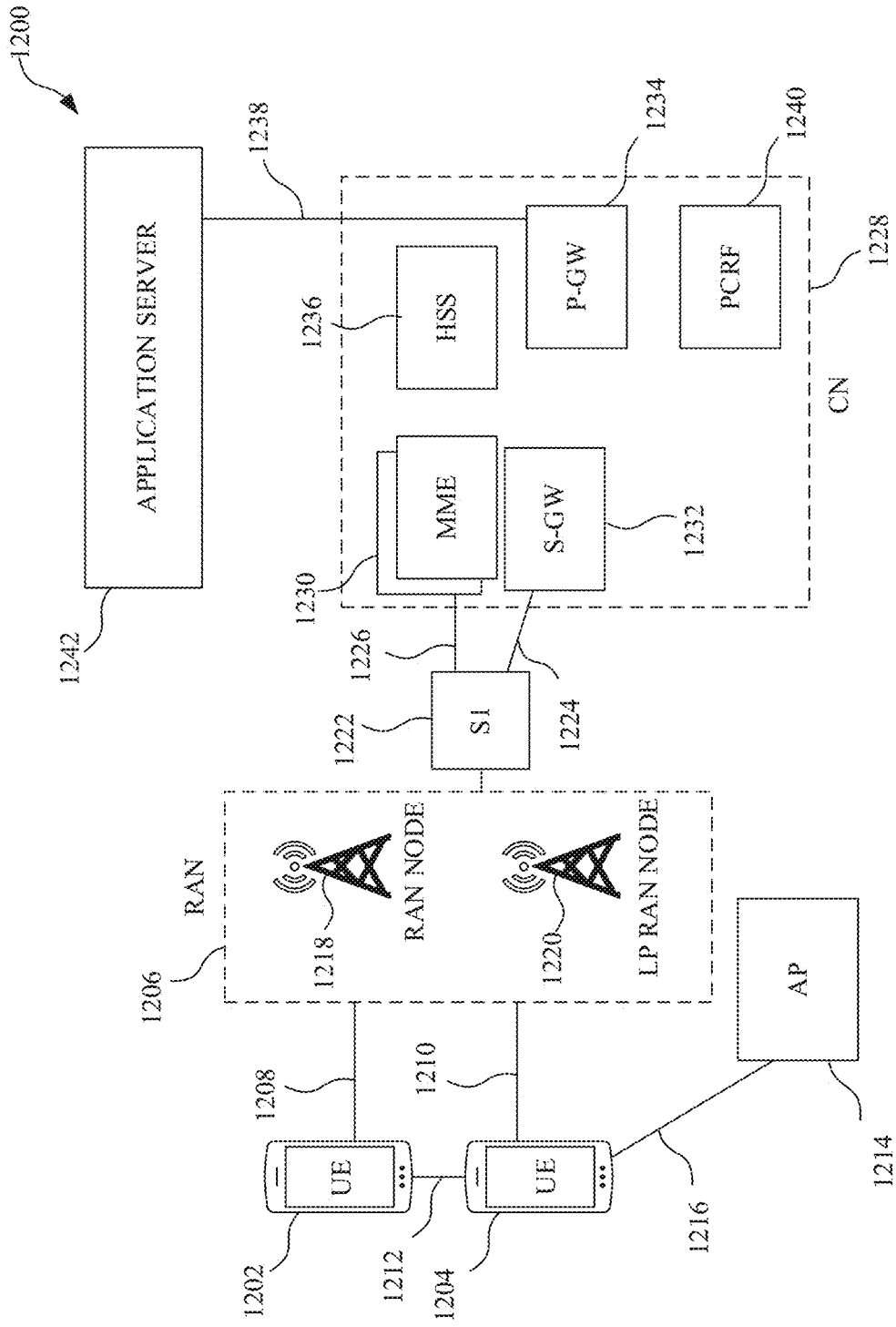
FIG. 12 illustrates an architecture of a wireless network in accordance with some embodiments.

FIG. 12 illustrates an architecture of a system 1200 of a network in accordance with some embodiments. The system 1200 includes one or more user equipment (UE), shown in this example as a UE 1202 and a UE 1204. The UE 1202 and the UE 1204 are illustrated as smartphones (e.g., handheld touchscreen mobile computing devices connectable to one or more cellular networks), but may also include any mobile or non-mobile computing device, such as Personal Data Assistants (PDAs), patters, laptop computers, desktop computers, wireless handsets, or any computing device including a wireless communications interface.

In some embodiments, any of the UE 1202 and the UE 1204 can include an Internet of Things (IoT) UE, which can include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1202 and the UE 1204 may be configured to connect, e.g., communicatively couple, with a radio access network (RAN), shown as RAN 1206. The RAN 1206 may be, for example, an Evolved ETniversal Mobile Telecommunications System (ETMTS) Terrestrial Radio Access Network (E-UTRAN), a NextGen RAN (NG RAN), or some other type of RAN. The UE 1202 and the UE 1204 utilize connection 1208 and connection 1210, respectively, each of which includes a physical communications interface or layer (discussed in further detail below); in this example, the connection 1208 and the connection 1210 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1202 and the UE 1204 may further directly exchange communication data via a ProSe interface 1212. The ProSe interface 1212 may alternatively be referred to as a sidelink interface including one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1204 is shown to be configured to access an access point (AP), shown as AP 1214, via connection 1216. The connection 1216 can include a local wireless connection, such as a connection consistent with any IEEE 802.11 protocol, wherein the AP 1214 would include a wireless fidelity (WiFi®) router. In this example, the AP 1214 may be connected to the Internet without connecting to the core network of the wireless system (described in further detail below).

The RAN 1206 can include one or more access nodes that enable the connection 1208 and the connection 1210. These access nodes (ANs) can be referred to as base stations (BSs), NodeBs, evolved NodeBs (eNBs), next Generation NodeBs (gNB), RAN nodes, and so forth, and can include ground stations (e.g., terrestrial access points) or satellite stations providing coverage within a geographic area (e.g., a cell). The RAN 1206 may include one or more RAN nodes for providing macrocells, e.g., macro RAN node 1218, and one or more RAN nodes for providing femtocells or picocells (e.g., cells having smaller coverage areas, smaller user capacity, or higher bandwidth compared to macrocells), e.g., a low power (LP) RAN node such as LP RAN node 1220.

Any of the macro RAN node 1218 and the LP RAN node 1220 can terminate the air interface protocol and can be the first point of contact for the UE 1202 and the UE 1204. In some embodiments, any of the macro RAN node 1218 and the LP RAN node 1220 can fulfill various logical functions for the RAN 1206 including, but not limited to, radio network controller (RNC) functions such as radio bearer management, uplink and downlink dynamic radio resource management and data packet scheduling, and mobility management.

In accordance with some embodiments, the UE 1202 and the UE 1204 can be configured to communicate using Orthogonal Frequency-Division Multiplexing (OFDM) communication signals with each other or with any of the macro RAN node 1218 and the LP RAN node 1220 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can include a plurality of orthogonal sub carriers.

In some embodiments, a downlink resource grid can be used for downlink transmissions from any of the macro RAN node 1218 and the LP RAN node 1220 to the UE 1202 and the UE 1204, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1202 and the UE 1204. The physical downlink control channel (PDCCH) may carry information about the transport format and resource allocations related to the PDSCH channel, among other things. It may also inform the UE 1202 and the UE 1204 about the transport format, resource allocation, and H-ARQ (Hybrid Automatic Repeat Request) information related to the uplink shared channel. Typically, downlink scheduling (assigning control and shared channel resource blocks to the UE 1204 within a cell) may be performed at any of the macro RAN node 1218 and the LP RAN node 1220 based on channel quality information fed back from any of the UE 1202 and UE 1204. The downlink resource assignment information may be sent on the PDCCH used for (e.g., assigned to) each of the UE 1202 and the UE 1204.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). ECCE may have other numbers of EREGs in some situations.

The RAN 1206 is communicatively coupled to a core network (CN), shown as CN 122—via an S1 interface 1222. In embodiments, the CN 1228 may be an evolved packet core (EPC) network, a NextGen Packet Core (NPC) network, or some other type of CN. In this embodiment the S1 interface 1222 is split into two parts: the S1-U interface 1224, which carries traffic data between the macro RAN node 1218 and the LP RAN node 1220 and a serving gateway (S-GW), shown as S-GW 1132, and an S1-mobility management entity MME) interface, shown as S1-MME interface 1226, which is a signaling interface between the macro RAN node 1218 and LP RAN node 1220 and the MME(s) 1230.

In this embodiment, the CN 1228 includes the MME(s) 1230, the S-GW 1232, a Packet Data Network (PDN) Gateway (P-GW) (shown as P-GW 1234), and a home subscriber server (HSS) (shown as HSS 1236). The MME(s) 1230 may be similar in function to the control plane of legacy Serving General Packet Radio Service (GPRS) Support Nodes (SGSN). The MME(s) 1230 may manage mobility aspects in access such as gateway selection and tracking area list management. The HSS 1236 may include a database for network users, including subscription-related information to support the network entities' handling of communication sessions. The CN 1228 may include one or several HSS 1236, depending on the number of mobile subscribers, on the capacity of the equipment, on the organization of the network, etc. For example, the HSS 1236 can provide support for routing/roaming, authentication, authorization, naming/addressing resolution, location dependencies, etc.

The S-GW 1232 may terminate the S1 interface 1222 towards the RAN 1206, and routes data packets between the RAN 1206 and the CN 1228. In addition, the S-GW 1232 may be a local mobility anchor point for inter-RAN node handovers and also may provide an anchor for inter-3GPP mobility. Other responsibilities may include lawful intercept, charging, and some policy enforcement.

The P-GW 1234 may terminate an SGi interface toward a PDN. The P-GW 1234 may route data packets between the CN 1228 (e.g., an EPC network) and external networks such as a network including the application server 1242 (alternatively referred to as application function (AF)) via an Internet Protocol (IP) interface (shown as IP communications interface 1238). Generally, an application server 1242 may be an element offering applications that use IP bearer resources with the core network (e.g., ETMTS Packet Services (PS) domain, LTE PS data services, etc.). In this embodiment, the P-GW 1234 is shown to be communicatively coupled to an application server 1242 via an IP communications interface 1238. The application server 1242 can also be configured to support one or more communication services Voice-over-Internet Protocol (VoIP) sessions, PTT sessions, group communication sessions, social networking services, etc.) for the UE 1202 and the UE 1204 via the CN 1228.

The P-GW 1234 may further be a node for policy enforcement and charging data collection. A Policy and Charging Enforcement Function (PCRF) (shown as PCRF 1240) is the policy and charging control element of the CN 1228. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1240 may be communicatively coupled to the application server 1242 via the P-GW 1234. The application server 1242 may signal the PCRF 1240 to indicate a new service flow and select the appropriate Quality of Service (QoS) and charging parameters. The PCRF 1240 may provision this rule into a Policy and Charging Enforcement Function (PCEF) (not shown) with the appropriate traffic flow template (TFT) and QoS class of identifier (QCI), which commences the QoS and charging as specified by the application server 1242.

Additional Examples

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE), including: obtaining, from a network device, a first configuration information, wherein the first configuration information indicates a first resource set for an aperiodic Sounding Reference Signal (AP-SRS), and wherein the first resource set for the AP-SRS includes a first list of slot offsets; decoding a second configuration information from the network device, wherein the second configuration information indicates a reference slot and a first slot offset of the first list of slot offsets; and generating the AP-SRS for transmission to the network device based on the reference slot and the first slot offset.

Example 2 is the method of Example 1, wherein the first resource set for the AP-SRS further includes a remaining slot offset, and wherein generating the AP-SRS for transmission to the network device based on the reference slot and the first slot offset includes: generating the AP-SRS for transmission to the network device based on the reference slot, the remaining slot offset and the first slot offset.

Example 3 is the method of Example 2, wherein generating the AP-SRS for transmission to the network device based on the reference slot, the remaining slot offset and the first slot offset includes: determining a first slot by adding the remaining slot offset to the reference slot; determining a second slot by adding the first slot offset to the first slot; and generating the AP-SRS for transmission to the network device at the second slot.

Example 4 is the method of Example 3, wherein the remaining slot offset is determined such that the first slot includes any slot, and the first slot offset is determined such that the second slot includes any available slot.

Example 5 is the method of Example 3, wherein the remaining slot offset is determined such that the first slot includes any available slot, and the first slot offset is determined such that the second slot includes any available slot.

Example 6 is the method of Example 1, wherein the first configuration information further indicates a second resource set for the AP-SRS, and wherein the second resource set for the AP-SRS includes a second list of slot offsets, and wherein the first configuration information further indicates that the first resource set for the AP-SRS and the second resource set for the AP-SRS are mapped to a same trigger state for the AP-SRS.

Example 7 is the method of Example 6, wherein the first resource set for the AP-SRS and the second resource set for the AP-SRS are triggered for transmission to the network device according to the same trigger state for the AP-SRS.

Example 8 is the method of Example 6, wherein the number of slot offsets in the first list of slot offsets is the same as the number of slot offsets of the second list of slot offsets.

Example 9 is the method of Example 6, wherein the number of slot offsets in the first list of slot offsets is different from the number of slot offsets of the second list of slot offsets.

Example 10 is the method of Example 1, wherein the first configuration information further indicates that the first resource set for the AP-SRS is mapped to multiple trigger states for the AP-SRS.

Example 11 is the method of Example 10, wherein the first list of slot offsets is associated with the multiple trigger states for the AP-SRS.

Example 12 is the method of Example 10, wherein the first resource set for the AP-SRS includes multiple lists of slot offsets, and wherein each list of slot offsets of the multiple lists of slot offsets one-to-one corresponds to one trigger state of the multiple trigger states for the AP-SRS.

Example 13 is the method of Example 1, wherein the first configuration information includes a Radio Resource Control (RRC) signaling and the second configuration information includes a Downlink Control Information (DCI).

Example 14 is the method of any of Examples 1-13, further including: obtaining, from the network device, a third configuration information, wherein the third configuration information activates a subset of the first list of slot offsets, and wherein the second configuration information indicates the first slot offset from the subset of the first list of slot offsets.

Example 15 is the method of Example 14, wherein the subset of the first list of slot offsets is activated per resource set for the AP-SRS.

Example 16 is the method of Example 14, wherein the subset of the first list of slot offsets is activated per trigger state for the AP-SRS.

Example 17 is the method of Example 14, wherein the third configuration information includes Media Access Control Control Element (MAC-CE) information.

Example 18 is a method for a network device, including: generating a first configuration information for transmission to a user equipment (UE), wherein the first configuration information indicates a first resource set for an aperiodic Sounding Reference Signal (AR-SRS), and wherein the first resource set for the AP-SRS includes a first list of slot offsets generating a second configuration information for transmission to the UE, wherein the second configuration information indicates a reference slot and a first slot offset of the first list of slot offsets, and obtaining the AP-SRS from the UE, wherein the AP-SES is transmitted based on the reference slot and the first slot offset.

Example 19 is the method of Example 18, wherein the first configuration information includes a Radio Resource Control (RRC) signaling and the second configuration information includes a Downlink Control information (DCI).

Example 20 is the method of Example 18 or 19, further including: generating a third configuration information, wherein the third configuration information activates a subset of the first list of slot offsets, and wherein the second configuration information indicates the first slot offset from the subset of the first list of slot offsets.

Example 21 is the method of Example 20, wherein the third configuration information includes Media Access Control Control Element (MAC-CE) information.

Example 22 is an apparatus for a user equipment (UE), the apparatus including: one or more processors configured to perform steps of the method according to any of Examples 1-17.

Example 23 is an apparatus of a network device, the apparatus including: one or more processors configured to perform steps of the method according to any of Examples 18-21.

Example 24 is a computer readable medium having computer programs stored thereon which, when executed by one or more processors, cause an apparatus to perform steps of the method according to any of Examples 1-21.

Example 25 is an apparatus for a communication device, including means for performing steps of the method according to any of Examples 1-21.

Example 26 is a computer program product including computer programs which, when executed by one or more processors, cause an apparatus to perform steps of the method according to any of Examples 1-21.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), comprising:
obtaining, from a network device, configuration information that indicates a first resource set and a second resource set for an aperiodic Sounding Reference Signal (AP-SRS), and wherein the first and second resource sets are mapped to a same trigger state for the AP-SRS, the first resource set for the AP-SRS includes a first list of slot offsets, the second resource set for the AP-SRS includes a second list of slot offsets, and a number of slot offsets in the first list of slot offsets is different from a number of slot offsets of the second list of slot offsets;
receiving control information from the network device;
determining, based on reception of the control information, a reference slot and a first slot offset of the first list of slot offsets; and
generating the AP-SRS for transmission to the network device based on the reference slot and the first slot offset.

2. The method of claim 1, wherein the first resource set for the AP-SRS further comprises a remaining slot offset, and generating the AP-SRS for transmission to the network device based on the reference slot and the first slot offset comprises:
generating the AP-SRS for transmission to the network device based on the reference slot, the remaining slot offset, and the first slot offset.

3. The method of claim 2, wherein generating the AP-SRS for transmission to the network device based on the reference slot, the remaining slot offset, and the first slot offset comprises:
determining a first slot by adding the remaining slot offset to the reference slot;
determining a second slot by adding the first slot offset to the first slot; and
generating the AP-SRS for transmission to the network device at the second slot.

4. The method of claim 3, wherein the remaining slot offset is determined such that the first slot comprises any slot, and the first slot offset is determined such that the second slot comprises any available slot.

5. The method of claim 3, wherein the remaining slot offset is determined such that the first slot comprises any available slot, and the first slot offset is determined such that the second slot comprises any available slot.

6. The method of claim 1, wherein the first resource set for the AP-SRS and the second resource set for the AP-SRS are triggered for transmission to the network device according to the same trigger state for the AP-SRS.

7. The method of claim 1, wherein the configuration information further indicates that the first resource set for the AP-SRS is mapped to multiple trigger states for the AP-SRS.

8. The method of claim 7, wherein the first list of slot offsets is associated with the multiple trigger states for the AP-SRS.

9. The method of claim 7, wherein the first resource set for the AP-SRS comprises multiple lists of slot offsets, and each list of slot offsets of the multiple lists of slot offsets one-to-one corresponds to one trigger state of the multiple trigger states for the AP-SRS.

10. The method of claim 1, wherein the configuration information is received via Radio Resource Control (RRC) signaling, the control information comprises Downlink Control Information (DCI), the number of slot offsets in the first list of slot offsets is N, the number of slot offsets in the second list of slot offsets is M, where N>M, and the DCI comprises a field having $\lceil log2(N) \rceil$ bits to indicate the first slot offset.

11. The method of claim 1, wherein the control information is first control information and the method further comprises:
obtaining, from the network device, second control information, wherein the second control information activates a subset of the first list of slot offsets, and
wherein the first control information indicates the first slot offset from the subset of the first list of slot offsets.

12. The method of claim 11, wherein the subset of the first list of slot offsets is activated per resource set for the AP-SRS or per trigger state for the AP-SRS.

13. The method of claim 11, wherein the second control information comprises Media Access Control-Control Element (MAC-CE) information.

14. The method of claim 1, further comprising:
determining, based on reception of the control information, a first slot offset of the second list of slot offsets; and generating the AP-SRS for transmission to the network device based further on the first slot offset of the second list of slot offsets.

15. A method for a network device, comprising:
generating configuration information for transmission to a user equipment (UE), wherein the configuration information indicates a first resource set for an aperiodic Sounding Reference Signal (AP-SRS), and wherein the first resource set for the AP-SRS comprises a first list of slot offsets;
generating first control information for transmission to the UE, wherein the first control information activates a subset of the first list of slot offsets;
generating second control information for transmission to the UE, wherein the second control information indicates a reference slot and a first slot offset from the subset of the first list of slot offsets; and
obtaining the AP-SRS from the UE, wherein the AP-SRS is transmitted based on the reference slot and the first slot offset.

16. The method of claim 15, wherein the configuration information comprises a Radio Resource Control (RRC) signaling and the second control information comprises a Downlink Control Information (DCI).

17. The method of claim 15, wherein the first control information comprises Media Access Control-Control Element (MAC-CE) information.

18. One or more non-transitory, computer-readable media having instructions that, when executed, cause a network device to:
transmit, to a user equipment (UE), configuration information that indicates a first resource set and a second resource set for an aperiodic Sounding Reference Signal (AP-SRS), and wherein the first and second resource sets are mapped to a same trigger state for the AP-SRS, the first resource set for the AP-SRS includes a first list of slot offsets, the second resource set for the AP-SRS includes a second list of slot offsets, and a number of slot offsets in the first list of slot offsets is different from a number of slot offsets of the second list of slot offsets;
transmit, to the UE, control information to indicate a reference slot and a first slot offset of the first list of slot offsets; and
receive, from the UE, the AP-SRS.

19. The one or more non-transitory, computer-readable media of claim 18, wherein the control information is to further indicate a first slot offset of the second list of slot offsets.

20. The one or more non-transitory, computer-readable media of claim 18, wherein the configuration information is received via Radio Resource Control (RRC) signaling, the control information comprises Downlink Control Information (DCI), the number of slot offsets in the first list of slot offsets is N, the number of slot offsets in the second list of slot offsets is M, where N>M, and the DCI comprises a field having $\lceil \log2(N) \rceil$ bits to indicate the first slot offset.

* * * * *